US012750255B2

(12) United States Patent
Duan et al.

(10) Patent No.: US 12,750,255 B2
(45) Date of Patent: Sep. 29, 2026

(54) TRACKING REFERENCE SIGNALS (TRSS) FOR JOINT COMMUNICATIONS AND SENSING

(71) Applicant: QUALCOMM Incorporated, San Diego, CA (US)

(72) Inventors: Weimin Duan, San Diego, CA (US); Alexandros Manolakos, Athens (GR); Muhammad Sayed Khairy Abdelghaffar, San Jose, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 18/866,030

(22) PCT Filed: May 23, 2023

(86) PCT No.: PCT/US2023/067363
§ 371 (c)(1),
(2) Date: Nov. 14, 2024

(87) PCT Pub. No.: WO2024/020257
PCT Pub. Date: Jan. 25, 2024

(65) Prior Publication Data
US 2025/0267040 A1 Aug. 21, 2025

(30) Foreign Application Priority Data
Jul. 18, 2022 (GR) .............................. 20220100565

(51) Int. Cl.
*H04L 25/02* (2006.01)
*H04B 7/06* (2006.01)
(Continued)

(52) U.S. Cl.
CPC ..... *H04L 25/0222* (2013.01); *H04B 7/06968* (2023.05); *H04L 5/0051* (2013.01); *H04W 72/40* (2023.01)

(58) Field of Classification Search
CPC ........ G01S 13/003; G01S 7/006; G01S 13/58; H04L 5/0053; H04L 5/0051;
(Continued)

(56) References Cited

U.S. PATENT DOCUMENTS

2020/0053703 A1* 2/2020 Akkarakaran ............ G01S 1/20
2022/0171016 A1 6/2022 Manolakos et al.
(Continued)

FOREIGN PATENT DOCUMENTS

WO 2021089133 A1 5/2021
WO WO-2023080814 A1 * 5/2023 ........... H04L 5/0001
WO WO-2023080816 A1 * 5/2023 ........... G01S 7/0232

OTHER PUBLICATIONS

International Search Report and Written Opinion—PCT/US2023/067363—ISA/EPO—Aug. 25, 2023.

*Primary Examiner* — Sophia Vlahos
(74) *Attorney, Agent, or Firm* — QUALCOMM Incorporated

(57) ABSTRACT

Disclosed are systems, apparatuses, processes, and computer-readable media for wireless communications. For example, an example of a process includes receiving a reflection signal from a target. In some cases, the reflection signal may include tracking reference signal (TRS) resources and radar reference signal (RS) resources. In some cases, the reflection signal may include sidelink (SL) single sideband (SSB) resources and SL radar RS resources. The process further includes determining a Doppler estimation for the target based on the reflection signal.

26 Claims, 16 Drawing Sheets

(51) Int. Cl.
*H04L 5/00* (2006.01)
*H04W 72/40* (2023.01)

(58) Field of Classification Search
CPC ............... H04L 25/0224; H04L 5/0048; H04L 25/0222; H04B 7/06968; H04W 72/40
See application file for complete search history.

(56) References Cited

U.S. PATENT DOCUMENTS

| | | | | |
|---|---|---|---|---|
| 2023/0362857 | A1* | 11/2023 | Ghanbarinejad | H04W 56/0045 |
| 2023/0396346 | A1* | 12/2023 | Liu | H04W 24/10 |
| 2024/0012095 | A1* | 1/2024 | Ali | G01S 1/024 |
| 2024/0072874 | A1* | 2/2024 | Ye | H04B 7/06968 |
| 2024/0106509 | A1* | 3/2024 | Yao | H04L 1/0003 |
| 2024/0310473 | A1* | 9/2024 | Jiang | H04Q 9/04 |

* cited by examiner

1200

| | $f_c$ = 3.5 GHz<br>$\Delta f$ = 30 kHz, W = 100 MHz | $f_c$ = 13 GHz<br>$\Delta f$ = 120 kHz, W = 400MHz |
|---|---|---|
| $\Delta d > c/(2W)$ | 1.5 m | 0.38 m |
| $\Delta v > c/(2f_c T_B)$ | 228 km/h | 245 km/h |
| $d_{max} < cT_g/2$ | 351 m | 87.9 m |
| $v_{max} < c\Delta f/(20f_c)$ | 541 km/h | 582 km/h |

FIG. 12

TRACKING REFERENCE SIGNALS (TRSS) FOR JOINT COMMUNICATIONS AND SENSING

CROSS-REFERENCE TO RELATED APPLICATIONS

This application for Patent is a 371 of international Patent Application PCT/US2023/067363, filed May 23, 2023, which claims priority to Greek patent application No. 20220100565, filed Jul. 18, 2022, all of which are hereby incorporated by referenced in their entirety and for all purposes.

FIELD OF THE DISCLOSURE

The present disclosure generally relates to wireless communications. For example, aspects of the present disclosure relate to employing tracking reference signals (TRSs) for joint communications and sensing.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

Due to larger bandwidths being allocated for wireless cellular communications systems (e.g., including 5G and 5G beyond) and more use cases being introduced into the cellular communications systems, joint communications and radio frequency (RF) sensing can be an essential feature for existing or future wireless communication systems, such as to enhance the overall spectral efficiency of the wireless communication networks.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for employing tracking reference signals (TRSs) for joint communications and sensing. According to at least one example, a method is provided for wireless communications at a user equipment (UE). The method includes: receiving, at the UE, a reflection signal from a target, wherein the reflection signal comprises tracking reference signal (TRS) resources and radar reference signal (RS) resources; and determining, at the UE, a Doppler estimation for the target based on the reflection signal.

In another example, an apparatus for wireless communications is provided that includes at least one memory and at least one processor (e.g., configured in circuitry) coupled to the at least one memory. The at least one processor is configured to: receive a reflection signal from a target, wherein the reflection signal comprises tracking reference signal (TRS) resources and radar reference signal (RS) resources; and determine a Doppler estimation for the target based on the reflection signal.

In another example, a non-transitory computer-readable medium is provided that has stored thereon instructions that, when executed by one or more processors, cause the one or more processors to: receive a reflection signal from a target, wherein the reflection signal comprises tracking reference signal (TRS) resources and radar reference signal (RS) resources; and determine a Doppler estimation for the target based on the reflection signal.

In another example, an apparatus for wireless communications is provided. The apparatus includes: means for receiving a reflection signal from a target, wherein the reflection signal comprises tracking reference signal (TRS) resources and radar reference signal (RS) resources; and means for determining a Doppler estimation for the target based on the reflection signal.

According to at least one other example, a method is provided for wireless communications at a user equipment (UE). The method includes: receiving, at the UE, a reflection signal from a target, wherein the reflection signal comprises sidelink (SL) single sideband (SSB) resources and SL radar reference signal (RS) resources; and determining, at the UE, a Doppler estimation for the target based on the reflection signal.

In another example, an apparatus for wireless communications is provided that includes at least one memory and at least one processor (e.g., configured in circuitry) coupled to the at least one memory. The at least one processor is configured to: receive a reflection signal from a target, wherein the reflection signal comprises sidelink (SL) single sideband (SSB) resources and SL radar reference signal (RS) resources; and determine a Doppler estimation for the target based on the reflection signal.

In another example, a non-transitory computer-readable medium is provided that has stored thereon instructions that, when executed by one or more processors, cause the one or more processors to: receive a reflection signal from a target, wherein the reflection signal comprises sidelink (SL) single sideband (SSB) resources and SL radar reference signal (RS) resources; and determine a Doppler estimation for the target based on the reflection signal.

In another example, an apparatus for wireless communications is provided. The apparatus includes: means for receiving a reflection signal from a target, wherein the reflection signal comprises sidelink (SL) single sideband (SSB) resources and SL radar reference signal (RS)

resources; and means for determining a Doppler estimation for the target based on the reflection signal.

In some aspects, the apparatus is, is part of, and/or includes a UE, such as a wearable device, an extended reality (XR) device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 12 is a table illustrating an example of sensing performance of the NR TRS slot configuration of FIG. 11.

DETAILED DESCRIPTION

Figure 1:
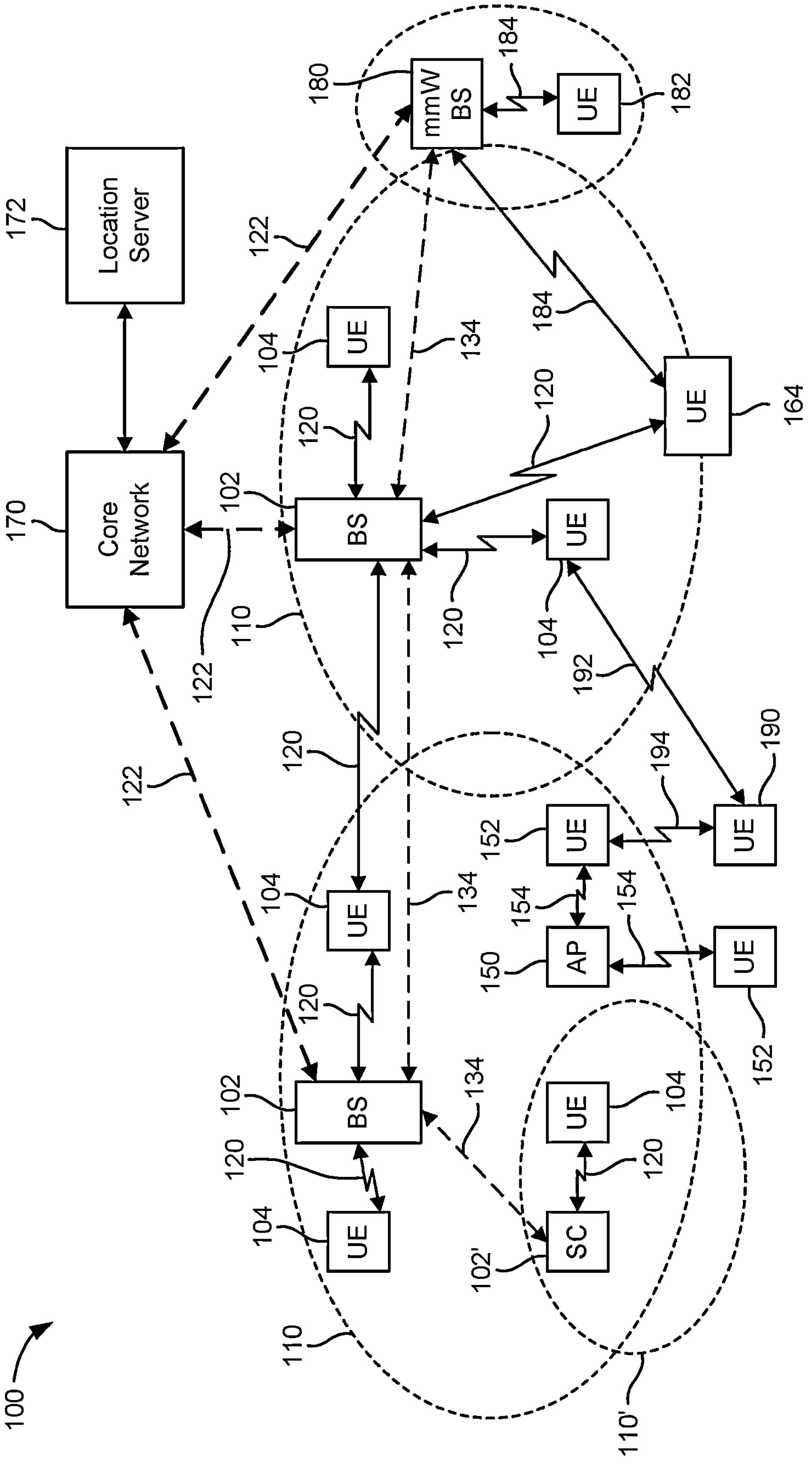
FIG. 1 is a diagram illustrating an example wireless communications system, which may be employed by the disclosed systems and techniques for joint communications and sensing, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As previously mentioned, due to larger bandwidths being allocated for wireless communications systems (e.g., including cellular communications systems such as 4G/LTE, 5G/NR, and beyond) and more use cases being introduced into the wireless communications systems, joint communications and RF sensing can be an essential feature for wireless communications systems.

Radar sensing systems typically use RF waveforms to perform RF sensing to determine or estimate one or more characteristics of a target object, such as the distance, angle, and/or velocity of the target object. A target object may include a vehicle, an obstruction, a user, a building, or other object. A typical radar system includes at least one transmitter, at least one receiver, and at least one processor. A radar system may perform bistatic sensing when one receiver of a first device is employed that is located remote from a transmitter of a second device. Similarly, a radar system may perform multi-static sensing when multiple receivers of multiple devices are employed that are all located remotely from at least one transmitter of at least one device.

During operation of a radar sensing system, a transmitter transmits an electromagnetic (EM) signal in the RF domain towards a target object. The signal reflects off of the target object to produce one or more reflection signals, which provides information or properties regarding the target, such as target object's location and speed. At least one receiver receives the one or more reflection signals and at least one processor, which may be associated with at least one receiver, utilizes the information from the one or more reflection signals to determine information or properties of the target object. A target object can also be referred herein as a target.

Generally, sensing involves monitoring moving targets with different motions (e.g., a moving car or pedestrian, a body motion of a person, such as breathing, and/or other micro-motions related to a target). Doppler, which measures the phase variation in a signal and is indicative of motion, is an important characteristic for sensing of a target.

It should be noted that these radar sensing signals, which can be referred to as radar reference signals (RSS), are typically designed for and solely used for sensing purposes. Radar RSs do not contain any communications information. Conversely, communication RSs are typically designed for and solely used for communications purposes, including estimating channel parameters for communications.

Cellular communications systems are designed to transmit communications signals on designated communications frequency bands (e.g., 23 gigahertz (GHz), 3.5 GHz, etc. for 5G/NR, 2.2 GHz for LTE, among others). RF sensing systems are designed to transmit RF sensing signals on designated radar RF frequency bands (e.g., 77 GHz for autonomous driving). The spectrum for communication and sensing is very likely to be shared in future cellular communication systems, in which case the communications and sensing should be jointly considered. In RF sensing, such as for Doppler estimation, phase continuity need to be maintained at radar transmitter side, which is not guaranteed for most of the NR reference signals (including the NR PRS).

In some aspects of the present disclosure, systems, apparatuses, methods (also referred to as processes), and computer-readable media (collectively referred to herein as "systems and techniques") are described herein that employ tracking reference signals (TRSs) for joint communications and sensing. For instance, the systems and techniques of the present disclosure can enhance RF sensing by leveraging TRSs by associating TRSs with radar RSs for Doppler estimation. In some cases, as described herein, the association can be based on phase continuity between the TRSs and radar RSs (e.g., based on phase continuity needing to be maintained at the radar transmitter side for RF sensing, such as for Doppler estimation). The systems and techniques also consider enhancement on communication performance by fine Doppler estimation supported by radar RSs.

As noted above, in RF sensing (e.g., for obtaining an accurate Doppler estimation), phase continuity needs to be maintained on the radar transmitter (Tx) side, which may be in the form of a base station or user equipment (UE). Phase continuity cannot be guaranteed for most NR reference signals (e.g., radar RSs), such as NR positioning reference signals (PRSs). However, a radar receiver (Rx), which may be in the form of UE or other device, may assume that the radar Tx maintains a phase coherence for up to, for example, two slots of NR TRS transmission from the radar Tx. In one or more examples, TRSs (e.g., TRS resources) and radar RSs (e.g., radar RS sensing resources) are associated for Doppler estimation by multiplexing the TRS resources and radar RS resources together within a slot (e.g., a slot structure), or within two consecutive slots, with the same or similar bandwidth (BW). This association implicitly indicates to the radar Rx that phase coherence is maintained for both the TRSs and radar RSs. Then, the TRSs and radar RSs may be utilized to provide for an accurate Doppler estimation.

In some examples, the TRSs and radar RSs are associated for Doppler estimation explicitly via signaling to a radar Rx. For these examples, the radar Tx may explicitly indicate, via signaling to the radar Rx, that the TRSs and radar RSs can be associated together to provide phase coherence for Doppler estimation. The radar Rx may then obtain a Doppler estimation (e.g., Doppler measurement) from the TRSs. Also, the radar Rx may generate a Doppler measurement report including the Doppler estimation based on the TRSs, and send the Doppler measurement report to a radar server in the network for further processing.

In one or more examples, the radar Rx may be engaging in high mobility communications (e.g., communications with another device, such as a UE, moving at a high velocity and/or the radar Rx moving at a high velocity) and, as such, a high accuracy Doppler estimation may be needed to be able to maintain the high mobility communications. For these cases, the radar Rx may obtain a high accuracy Doppler estimation from the radar RSs. TRSs, when phase continuous, can provide for a coarse measurement of the Doppler, while radar RSs, when phase continuous, can provide for a fine measurement of the Doppler.

As previously mentioned, the association of TRSs and radar RSs together within a slot or within two consecutive slots, with the same or similar BW, implicitly indicates to the radar Rx that phase coherence is maintained for the associated radar RSs. However, in some cases, the radar Rx may not be scheduled for a sensing session and, as such, the radar RSs by default may be transparent to the radar Rx. For these cases, assistance signaling may be provided to the radar Rx to indicate the configuration of the radar RSs with the TRSs to allow for the radar Rx to recognize that the radar RSs are phase continuous and, as such, can provide for a high accuracy doppler measurement. The radar Rx may then obtain a high accuracy Doppler estimation (e.g., Doppler measurement) from the radar RSs, and generate a Doppler measurement report based on the high accuracy Doppler estimation based on the radar RSs. The radar Rx may then send the Doppler measurement report based on the associated radar RSs to the radar server.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal includes an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100, which may be employed by the disclosed systems and techniques for employing tracking reference signals (TRSs) for joint communications and sensing, in accordance with some aspects of the present disclosure. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHZ, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-colocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
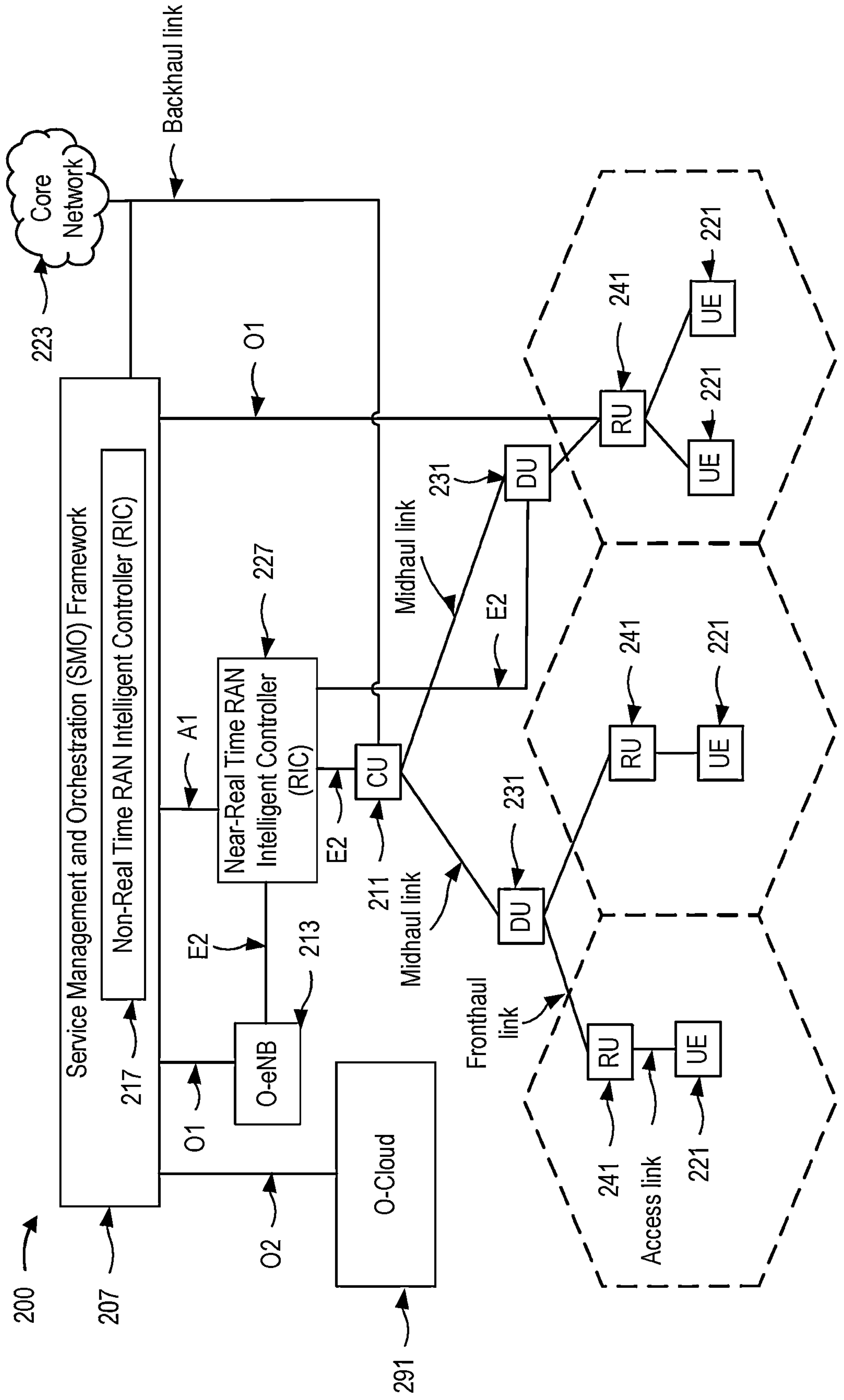
FIG. 2 is a diagram illustrating an example of a disaggregated base station architecture, which may be employed by the disclosed systems and techniques for employing tracking reference signals (TRSs) for joint communications and sensing, in accordance with some aspects of the present disclosure.

FIG. 2 is a diagram illustrating an example of a disaggregated base station architecture, which may be employed by the disclosed systems and techniques for employing TRSs for joint communications and sensing, in accordance with some aspects of the present disclosure. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), a virtual radio unit (VRU), etc.).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2 shows a diagram illustrating an example disaggregated base station 200 architecture. The disaggregated base station 200 architecture may include one or more central units (CUs) 211 that can communicate directly with a core network 223 via a backhaul link, or indirectly with the core network 223 through one or more disaggregated base station units (such as a Near-Real Time (Near-RT) RAN Intelligent Controller (RIC) 227 via an E2 link, or a Non-Real Time (Non-RT) RIC 217 associated with a Service Management and Orchestration (SMO) Framework 207, or both). A CU 211 may communicate with one or more distributed units (DUs) 231 via respective midhaul links, such as an F1 interface. The DUs 231 may communicate with one or more radio units (RUS) 241 via respective fronthaul links. The RUs 241 may communicate with respective UEs 221 via one or more RF access links. In some implementations, the UE 221 may be simultaneously served by multiple RUs 241.

Each of the units, e.g., the CUS 211, the DUs 231, the RUs 241, as well as the Near-RT RICs 227, the Non-RT RICs 217 and the SMO Framework 207, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (e.g., Central Unit-User Plane (CU-UP)), control plane functionality (e.g., Central Unit-Control Plane (CU-CP)), or a combination thereof. In some implementations, the CU 211 can be logically split into one or more CU-UP units and one or more CU-CP units. The CU-UP unit can communicate bidirectionally with the CU-CP unit via an interface, such as the E1 interface when implemented in an O-RAN configuration. The CU 211 can be implemented to communicate with the DU 231, as necessary, for network control and signaling.

The DU 231 may correspond to a logical unit that includes one or more base station functions to control the operation of one or more RUs 241. In some aspects, the DU 221 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 221. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 207 may be configured to support RAN deployment and provisioning of non-virtualized and virtualized network elements. For non-virtualized network elements, the SMO Framework 207 may be configured to support the deployment of dedicated physical resources for RAN coverage requirements which may be managed via an operations and maintenance interface (such as an O1 interface). For virtualized network elements, the SMO Framework 207 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 227. In some implementations, the SMO Framework 207 can communicate with a hardware aspect of a 4G RAN, such as an open eNB (O-eNB) 213, via an O1 interface. Additionally, in some implementations, the SMO Framework 207 can communicate directly with one or more RUs 241 via an O1 interface. The SMO Framework 207 also may include a Non-RT RIC 217 configured to support functionality of the SMO Framework 207.

The Non-RT RIC 217 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227. The Non-RT RIC 217 may be coupled to or communicate with (such as via an A1 interface) the Near-RT RIC 227. The Near-RT RIC 227 may be configured to include a logical function that enables near-real-time control and optimization of RAN elements and resources via data collection and actions over an interface (such as via an E2 interface) connecting one or more CUs 211, one or more DUs 231, or both, as well as an O-eNB 213, with the Near-RT RIC 227.

In some implementations, to generate AI/ML models to be deployed in the Near-RT RIC 227, the Non-RT RIC 217 may receive parameters or external enrichment information from external servers. Such information may be utilized by the Near-RT RIC 227 and may be received at the SMO Framework 207 or the Non-RT RIC 117 from non-network data sources or from network functions. In some examples, the Non-RT RIC 217 or the Near-RT RIC 227 may be configured to tune RAN behavior or performance. For example, the Non-RT RIC 217 may monitor long-term trends and patterns for performance and employ AI/ML models to perform corrective actions through the SMO Framework 207 (such as reconfiguration via O1) or via creation of RAN management policies (such as A1 policies).

Figure 3:
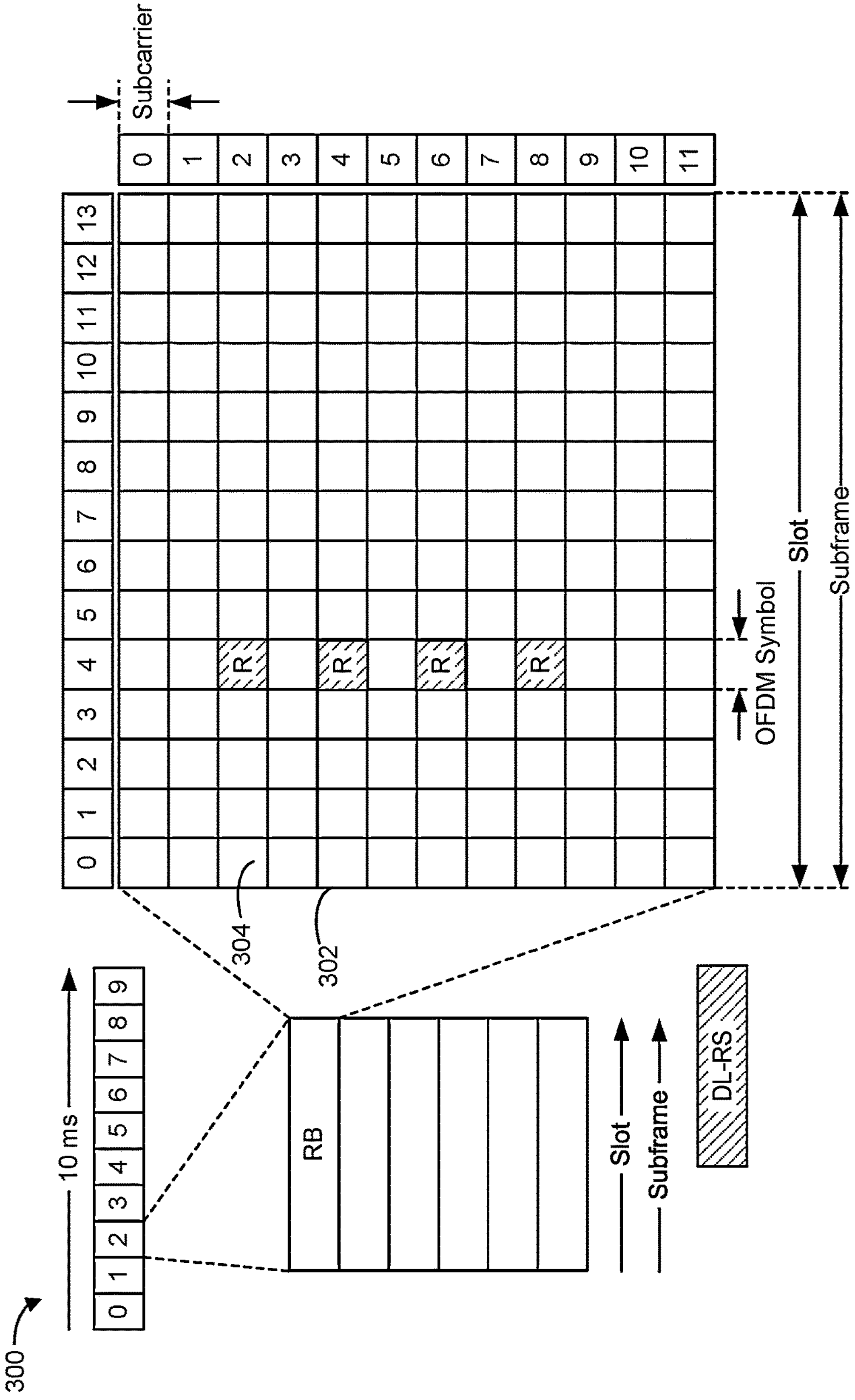
FIG. 3 is a diagram illustrating an example of a frame structure, which may be employed by the disclosed systems and techniques for employing TRSs for joint communications and sensing, in accordance with some aspects of the present disclosure.

Various radio frame structures may be used to support downlink, uplink, and sidelink transmissions between network nodes (e.g., base stations and UEs). FIG. 3 is a diagram 300 illustrating an example of a frame structure, which may be employed by the disclosed systems and techniques for employing TRSs for joint communications and sensing, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHZ (e.g., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302, which may be employed by the disclosed systems and techniques for employing TRSs for joint communications and sensing, in accordance with some aspects of the present disclosure. Data or information for communications and/or sensing may be included in one or more RBs 302. The RB 302 is arranged with the time domain on the horizontal (or x-) axis and the frequency domain on the vertical (or y-) axis. As shown, the RB 302 may be 180 kilohertz (kHz) wide in frequency and one slot long in time (with a slot being 1 milliseconds (ms) in time). In some cases, the slot may include fourteen symbols (e.g., in a slot configuration 0). The RB 302 includes twelve subcarriers (along the y-axis) and fourteen symbols (along the x-axis).

An intersection of a symbol and subcarrier can be referred to as a resource element (RE) 304 or tone. The RB 302 of FIG. 3 includes multiple REs, including the resource element (RE) 304. For instance, a RE 304 is 1 subcarrier x 1 symbol (e.g., OFDM symbol), and is the smallest discrete part of the subframe. A RE 304 includes a single complex value representing data from a physical channel or signal. The number of bits carried by each RE 304 depends on the modulation scheme.

In some aspects, some REs 304 can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs 304 used to transmit DL-RS (labeled "R").

Figure 4:
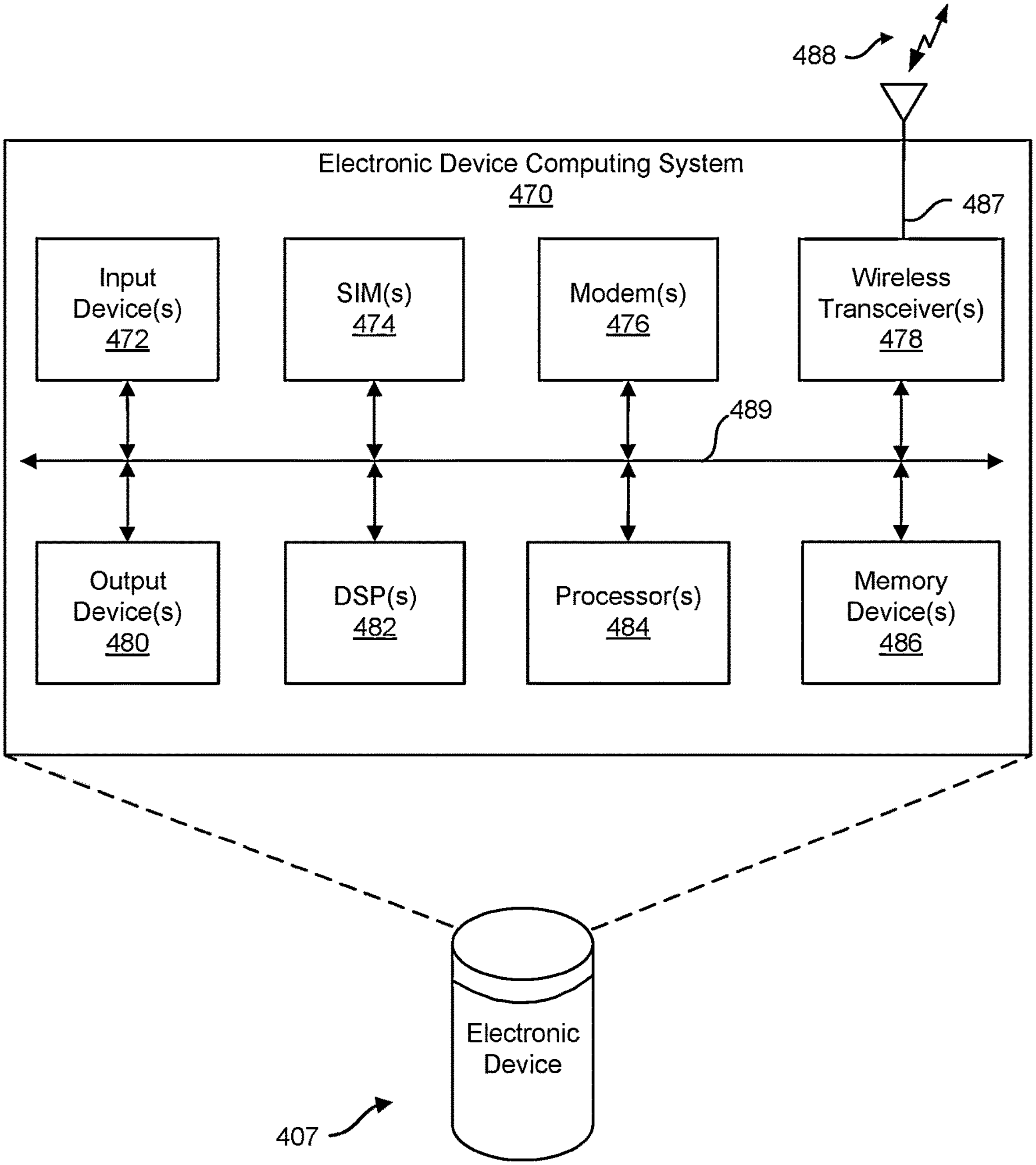
FIG. 4 is a block diagram illustrating an example of a computing system of an electronic device that may be employed by the disclosed systems and techniques for employing TRSs for joint communications and sensing, in accordance with some aspects of the present disclosure.

FIG. 4 is a block diagram illustrating an example of a computing system 470 of an electronic device 407, which may be employed by the disclosed systems and techniques for employing TRSs for joint communications and sensing, in accordance with some aspects of the present disclosure. The electronic device 407 is an example of a device that can include hardware and software for the purpose of connecting and exchanging data with other devices and systems using a communications network (e.g., a 3rd Generation Partnership network, such as a 5th Generation (5G)/New Radio (NR) network, a 4th Generation (4G)/Long Term Evolution (LTE) network, a WiFi network, or other communications network). For example, the electronic device 407 can include, or be a part of, a mobile device (e.g., a mobile telephone), a wearable device (e.g., a network-connected or smart watch), an extended reality device (e.g., a virtual reality (VR) device, an augmented reality (AR) device, or a mixed reality (MR) device), a personal computer, a laptop computer, a tablet computer, an Internet-of-Things (IoT) device, a wireless access point, a router, a vehicle or component of a vehicle, a server computer, a robotics device, and/or other device used by a user to communicate over a wireless communications network. In some cases, the device 407 can be referred to as user equipment (UE), such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICS, FPGAs, APs, GPUs, VPUs, NSPs, microcontrollers, dedicated hardware, any combination thereof, and/or other processing device/s and/or system/s. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone or a microphone array, and/or the like), and one or more output devices 480 (e.g., a display, a speaker, a printer, and/or the like).

The one or more wireless transceivers 478 can receive wireless signals (e.g., signal 488) via antenna 487 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that RF signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 478.

The one or more SIMs 474 can each securely store an international mobile subscriber identity (IMSI) number and related key assigned to the user of the electronic device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a WiFi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the electronic device 407 can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) 480, DSP(s) 482, processors 484, memory device(s) 486, and/or antenna (s) 487.

In some aspects, the electronic device 407 can include means for employing TRSs for joint communications and sensing. In some examples, any or all of these means can include the one or more wireless transceivers 478, the one or more modems 476, the one or more processors 484, the one or more DSPs 482, the one or more memory devices 486, any combination thereof, or other component(s) of the electronic device 407.

Figure 5:
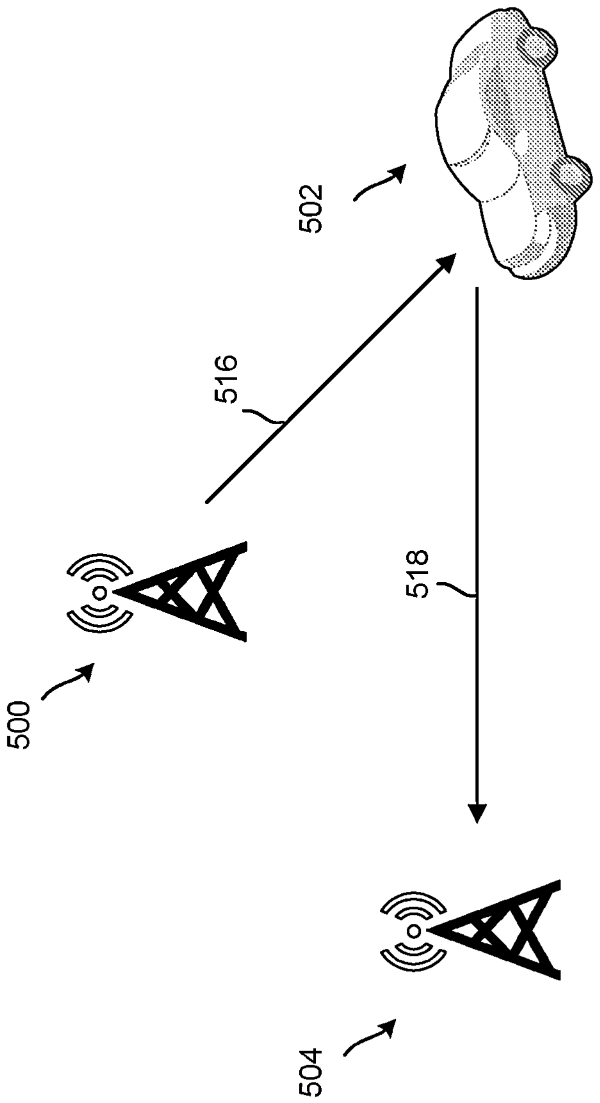
FIG. 5 is a diagram illustrating an example of a receiver utilizing RF bistatic sensing techniques with one transmitter, which may be employed by the disclosed systems and techniques for employing TRSs for joint communications and sensing, to determine one or more characteristics of a target object, in accordance with some aspects of the present disclosure.

FIG. 5 is a diagram illustrating an example of a receiver 504 utilizing RF bistatic sensing techniques with one transmitter 500, which may be employed by the disclosed systems and techniques for employing TRSs for joint communications and sensing, to determine one or more characteristics (e.g., location, speed or velocity, heading, etc.) of a target 502 object, in accordance with some aspects of the present disclosure. For example, the receiver 504 can use the RF bistatic sensing to detect a presence and location of a target 502 (e.g., an object, user, or vehicle), which is illustrated in the form of a vehicle in FIG. 5. In one example, the receiver 504 may be in the form of a base station, such as a gNB.

The bistatic radar system of FIG. 5 includes a transmitter 500 (e.g., a transmit sensing node), which in this figure is depicted to be in the form of a base station (e.g., gNB), and a receiver 504 (e.g., a receive sensing node) that are separated by a distance comparable to the expected target distance. The transmitter 500 and the receiver 504 of the bistatic radar system of FIG. 5 are located remote from one another. Conversely, monostatic radar is a radar system comprising a transmitter and a receiver that are co-located with one another.

An advantage of bistatic radar (or more generally, multistatic radar, which has more than one receiver) over monostatic radar is the ability to collect radar returns reflected from a scene at angles different than that of a transmitted pulse. This can be of interest to some applications (e.g., vehicle applications, scenes with multiple objects, military applications, etc.) where targets may reflect the transmitted energy in many directions (e.g., where targets are specifically designed to reflect in many directions), which can minimize the energy that is reflected back to the transmitter. It should be noted that, in one or more examples, a monostatic system can coexist with a multistatic radar system, such as when the transmitter also has a co-located receiver.

In some examples, the transmitter 500 and/or the receiver 504 of FIG. 5 can be a mobile phone, a tablet computer, a wearable device, a vehicle, or other device (e.g., device 407 of FIG. 4) that includes at least one RF interface. In some examples, the transmitter 500 and/or the receiver 504 can be a device that provides connectivity for a user device (e.g., for device 407 of FIG. 4), such as a base station (e.g., a gNB, eNB, etc.), a wireless access point (AP), or other device that includes at least one RF interface.

In some aspects, transmitter 500 can include one or more components for transmitting an RF signal. The transmitter 500 can include at least one processor (e.g., at least one processor 1610 of FIG. 16) that is capable of determining signals (e.g., determining the waveforms for the signals) to be transmitted. The transmitter 500 can also include an RF transmitter for transmission of a Tx signal comprising Tx waveform 516. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter can be coupled to one or more transmitting antennas, such as a Tx antenna. In some examples, a Tx antenna can be an omnidirectional antenna that is capable of transmitting an RF signal in all directions, or a directional antenna that transmits an RF signal in a particular direction. In some examples, the Tx antenna may include multiple antennas (e.g., elements) configured as an antenna array.

The receiver 504 can include one or more components for receiving an RF signal. For example, the receiver 504 may include one or more receiving antennas, such as an Rx antenna. In some examples, an Rx antenna can be an omnidirectional antenna capable of receiving RF signals from multiple directions, or a directional antenna that is configured to receive signals from a particular direction. In further examples, the Rx antenna can include multiple antennas (e.g., elements) configured as an antenna array.

The receiver 504 may also include an RF receiver coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., at least one processor 1610 of FIG. 16). The processor(s) may be configured to process a received waveform (e.g., Rx waveform 518).

In one or more examples, transmitter 500 can implement RF sensing techniques, for example bistatic sensing techniques, by causing a Tx waveform 516 to be transmitted from a Tx antenna. It should be noted that although the Tx waveform 516 is illustrated as a single line, in some cases, the Tx waveform 516 can be transmitted in all directions by an omnidirectional Tx antenna.

In one or more aspects, one or more parameters associated with the Tx waveform 516 may be used to increase or decrease RF sensing resolution. The parameters may include frequency, bandwidth, number of spatial streams, the number of antennas configured to transmit Tx waveform 516, the number of antennas configured to receive a reflected RF signal (e.g., Rx waveform 518) corresponding to the Tx waveform 516, the number of spatial links (e.g., number of spatial streams multiplied by number of antennas configured to receive an RF signal), the sampling rate, or any combination thereof. The transmitted waveform (e.g., Tx waveform 516) and the received waveform (e.g., the Rx waveform 518) can include one or more radar RF sensing signals (also referred to as RF sensing RSs).

During operation, the receiver 504 (e.g., which operates as a receive sensing node) can receive signals that correspond to Tx waveform 516, which is transmitted by the transmitter 500 (e.g., which operates as a transmit sensing node). For example, the receiver 504 can receive signals that are reflected from objects or people that are within range of the Tx waveform 516, such as Rx waveform 518 reflected from target 502. In some cases, the Rx waveform 518 can include multiple sequences that correspond to multiple copies of a sequence that are included in the Tx waveform 516. In some examples, the receiver 504 may combine the multiple sequences that are received to improve the SNR.

In some examples, RF sensing data can be used by at least one processor within the receiver 504 to calculate distances, angles of arrival, or other characteristics that correspond to reflected waveforms, such as the Rx waveform 518. In other examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 502) in the surrounding environment in order to detect target presence/proximity.

The processor(s) of the receiver 504 can calculate distances and angles of arrival corresponding to reflected waveforms (e.g., the distance and angle of arrival corresponding to the Rx waveform 518) by using signal processing, machine learning algorithms, any other suitable technique, or any combination thereof. In other examples, the receiver 504 can transmit or send the RF sensing data to at least one processor of another computing device, such as a server, that can perform the calculations to obtain the distance and angle of arrival corresponding to the Rx waveform 518 or other reflected waveforms.

In one or more examples, the angle of arrival of the Rx waveform 518 can be calculated by a processor(s) of the receiver 504 by measuring the time difference of arrival of the Rx waveform 518 between individual elements of a receive antenna array of the receiver 504. In some examples, the time difference of arrival can be calculated by measuring the difference in received phase at each element in the receive antenna array.

In some cases, the distance and the angle of arrival of the Rx waveform 518 can be used by the processor(s) of the receiver 504 to determine the distance between the receiver 504 and the target 502 as well as the position of target 502 relative to the receiver 504. The distance and the angle of arrival of the Rx waveform 518 can also be used to determine presence, movement, proximity, identity, or any combination thereof, of the target 502. For example, the processor(s) of the receiver 504 may use the calculated distance and angle of arrival corresponding to the Rx waveform 518 to determine that the target 502 is moving towards the receiver 504.

Figure 6:
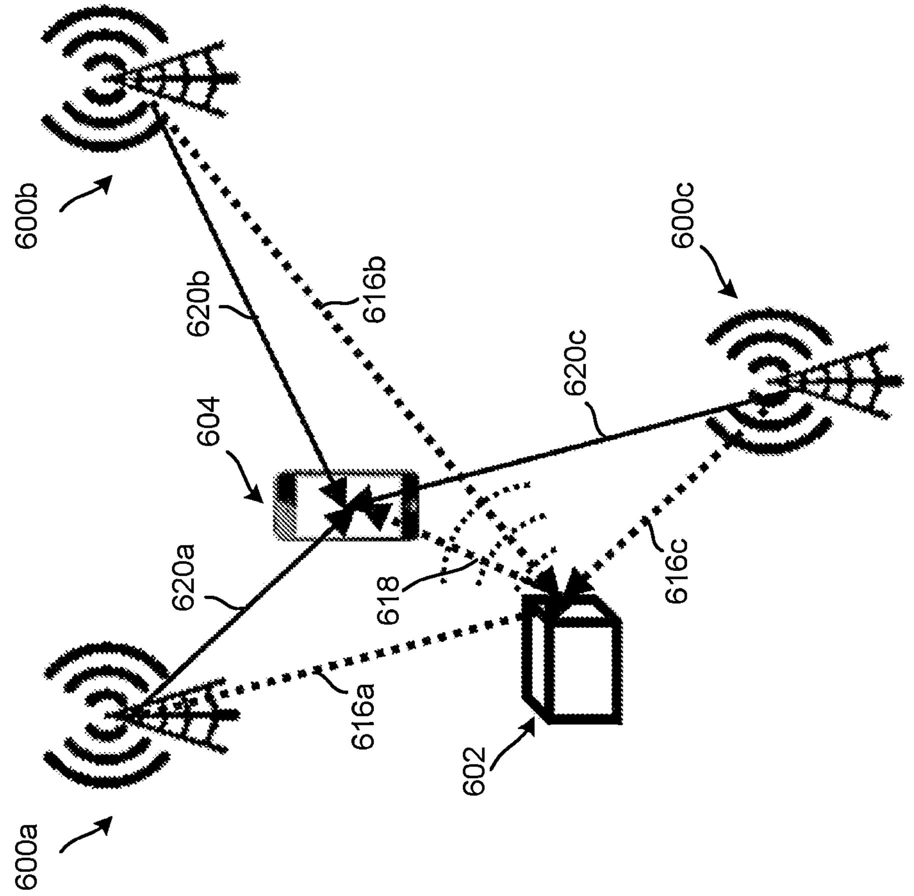
FIG. 6 is a diagram illustrating an example of a receiver utilizing RF bistatic sensing techniques with multiple transmitters, which may be employed by the disclosed systems and techniques for employing TRSs for joint communications and sensing, to determine one or more characteristics of a target object, in accordance with some aspects of the present disclosure.

FIG. 6 is a diagram illustrating an example of a receiver 604, in the form of a smart phone, utilizing RF bistatic sensing techniques with multiple transmitters (including a transmitter 600*a*, a transmitter 600*b*, and a transmitter 600*c*), which may be employed by the disclosed systems and techniques for employing TRSs for joint communications and sensing, to determine one or more characteristics (e.g., location, velocity or speed, heading, etc.) of a target 602 object, in accordance with some aspects of the present disclosure. For example, the receiver 604 may use RF bistatic sensing to detect a presence and location of a target 602 (e.g., an object, user, or vehicle). The target 602 is depicted in FIG. 6 in the form of an object that does not have communications capabilities (which can be referred to as a device-free object), such as a person, a vehicle (e.g., a vehicle without the ability to transmit and receive messages, such as using C-V2X or DSRC protocols), or other device-free object. The bistatic radar system of FIG. 6 is similar to the bistatic radar system of FIG. 5, except that the bistatic radar system of FIG. 6 has multiple transmitters 600*a*, 600*b*, 600*c*, while the bistatic radar system of FIG. 5 has only one transmitter 500.

The bistatic radar system of FIG. 6 includes multiple transmitters 600*a*, 600*b*, 600*c* (e.g., transmit sensing nodes), which are illustrated to be in the form of base stations. The bistatic radar system of FIG. 6 also includes a receiver 604 (e.g., a receive sensing node), which is depicted in the form of a smart phone. The each of the transmitters 600*a*, 600*b*, 600*c* is separated from the receiver 604 by a distance comparable to the expected distance from the target 602. Similar to the bistatic system of FIG. 5, the transmitters 600*a*, 600*b*, 600*c* and the receiver 604 of the bistatic radar system of FIG. 6 are located remote from one another.

In one or more examples, the transmitters 600*a*, 600*b*, 600*c* and/or the receiver 604 may each be a mobile phone, a tablet computer, a wearable device, a vehicle (e.g., a vehicle configured to transmit and receive communications according to C-V2X, DSRC, or other communication protocol), or other device (e.g., device 407 of FIG. 4) that includes at least one RF interface. In some examples, the transmitters 600*a*, 600*b*, 600*c* and/or the receiver 604 may each be a device that provides connectivity for a user device (e.g., for device 407 of FIG. 4), such as a base station (e.g., a gNB, eNB, etc.), a wireless access point (AP), or other device that includes at least one RF interface.

The transmitters 600*a*, 600*b*, 600*c* may include one or more components for transmitting an RF signal. Each of the transmitters 600*a*, 600*b*, 600*c* may include at least one processor (e.g., the processor(s) 1610 of FIG. 16) that is capable of determining signals (e.g., determining the waveforms for the signals) to be transmitted. Each of the transmitters 600*a*, 600*b*, 600*c* can also include an RF transmitter for transmission of Tx signals comprising Tx waveforms 616*a*, 616*b*, 616*c*, 620*a*, 620*b*, 620*c*. In one or more examples, Tx waveforms 616*a*, 616*b*, 616*c* are RF sensing signals, and Tx waveforms 620*a*, 620*b*, 620*c* are communications signals. In one or more examples, the Tx waveforms 620*a*, 620*b*, 620*c* are communications signals that may be used for scheduling transmitters (e.g., transmitters 600*a*, 600*b*, 600*c*) and receivers (e.g., receiver 604) for performing RF sensing of a target (e.g., target 602) to obtain location information regarding the target. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter may be coupled to one or more transmitting antennas, such as a Tx antenna. In one or more examples, a Tx antenna can be an omnidirectional antenna that is capable of transmitting an RF signal in all directions, or a directional antenna that transmits an RF signal in a particular direction. The Tx antenna may include multiple antennas (e.g., elements) configured as an antenna array.

The receiver 604 of FIG. 6 may include one or more components for receiving an RF signal. For example, the receiver 604 can include one or more receiving antennas, such as an Rx antenna. In one or more examples, an Rx antenna can be an omnidirectional antenna capable of receiving RF signals from multiple directions, or a directional antenna that is configured to receive signals from a particular direction. In some examples, the Rx antenna may include multiple antennas (e.g., elements) configured as an antenna array (e.g., a phase antenna array), which may be used for communications and/or sensing.

The receiver 604 can also include an RF receiver coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the processor(s) 1610 of FIG. 16). The processor(s) may be configured to process a received waveform (e.g., Rx waveform 618, which is a reflection (echo) RF sensing signal).

In some examples, the transmitters 600*a*, 600*b*, 600*c* can implement RF sensing techniques, for example bistatic sensing techniques, by causing Tx waveforms 616*a*, 616*b*, 616*c* (e.g., radar sensing signals) to be transmitted from a Tx antenna associated with each of the transmitters 600*a*, 600*b*, 600*c*. Although the Tx waveforms 616*a*, 616*b*, 616*c* are illustrated as single lines, in some cases, the Tx waveforms 616*a*, 616*b*, 616*c* may be transmitted in all directions (e.g., by an omnidirectional Tx antenna associated with each of the transmitters 600*a*, 600*b*, 600*c*).

In one or more aspects, one or more parameters associated with the Tx waveforms 616*a*, 616*b*, 616*c* may be used to increase or decrease RF sensing resolution. The parameters can include, but are not limited to, frequency, bandwidth, number of spatial streams, the number of antennas configured to transmit Tx waveforms 616*a*, 616*b*, 616*c*, the number of antennas configured to receive a reflected (echo) RF signal (e.g., Rx waveform 618) corresponding to each of the Tx waveforms 616*a*, 616*b*, 616*c*, the number of spatial links (e.g., number of spatial streams multiplied by number of antennas configured to receive an RF signal), the sampling rate, or any combination thereof. The transmitted waveforms (e.g., Tx waveforms 616*a*, 616*b*, 616*c*) and the received waveforms (e.g., the Rx waveform 618) may include one or more radar RF sensing signals (also referred to as RF sensing RSs). It should be noted that although only one reflected sensing signal (e.g., Rx waveform 618) is shown in FIG. 6, it is understood that a separate reflection (echo) sensing signal will be generated by each sensing signal (e.g., Tx waveforms 616*a*, 616*b*, 616*c*) reflecting off of the target 602.

During operation of the system of FIG. 6, the receiver 604 (e.g., which operates as a receive sensing node) can receive signals that correspond to Tx waveforms 616*a*, 616*b*, 616*c*, which are transmitted by the transmitters 600*a*, 600*b*, 600*c* (e.g., which each operate as a transmit sensing node). The receiver 604 can receive signals that are reflected from objects or people that are within range of the Tx waveforms 616*a*, 616*b*, 616*c*, such as Rx waveform 618 reflected from the target 602. In one or more examples, the Rx waveform 618 may include multiple sequences that correspond to multiple copies of a sequence that are included in its corresponding Tx waveform 616*a*, 616*b*, 616*c*. In some examples, the receiver 604 may combine the multiple sequences that are received to improve the SNR.

In some examples, RF sensing data can be used by at least one processor within the receiver 604 to calculate distances, angles of arrival (AOA), TDOA, angle of departure (AoD), or other characteristics that correspond to reflected waveforms (e.g., Rx waveform 618). In further examples, RF sensing data can also be used to detect motion, determine location, detect changes in location or motion patterns, or any combination thereof. In one or more examples, the distance and angle of arrival of the reflected signals can be used to identify the size, position, movement, and/or orientation of targets (e.g., target 602) in order to detect target presence/proximity.

The processor(s) of the receiver 604 can calculate distances and angles of arrival corresponding to reflected waveforms (e.g., the distance and angle of arrival corresponding to the Rx waveform 618) by using signal processing, machine learning algorithms, any other suitable technique, or any combination thereof. In one or more examples, the receiver 604 can transmit or send the RF sensing data to at least one processor of another computing device, such as a server, that can perform the calculations to obtain the distance and angle of arrival corresponding to the Rx waveform 618 or other reflected waveforms (not shown).

In one or more examples, a processor(s) of the receiver 604 can calculate the angle of arrival (AOA) of the Rx waveform 618 by measuring the TDOA of the Rx waveform 618 between individual elements of a receive antenna array of the receiver 604. In some examples, the TDOA can be calculated by measuring the difference in received phase at each element in the receive antenna array. In one illustrative example, to determine TDOA, the processor(s) can determine the difference time of arrival of the Rx waveform 618 to the receive antenna array elements, using one of them as a reference. The time difference is proportional to distance differences.

In some cases, the processor(s) of the receiver 604 can use the distance, the AOA, the TDOA, other measured information (e.g., AoD, etc.), any combination thereof, of the Rx waveform 618 to determine the distance between the receiver 604 and the target 602, and determine the position of target 602 relative to the receiver 604. In one example, the processor(s) can apply a multilateration or other location-based algorithm using the distance, AOA, and/or TDOA information as input to determine a position (e.g., 3D position) of the target 602. In other examples, the processor (s) can use the distance, the AOA, and/or the TDOA of the Rx waveform 618 to determine a presence, movement (e.g., velocity or speed, heading or direction or movement, etc.), proximity, identity, any combination thereof, or other characteristic of the target 602. For instance, the processor(s) of the receiver 604 may use the distance, the AOA, and/or the TDOA corresponding to the Rx waveform 618 to determine that the target is moving towards the receiver 604.

Figure 7:
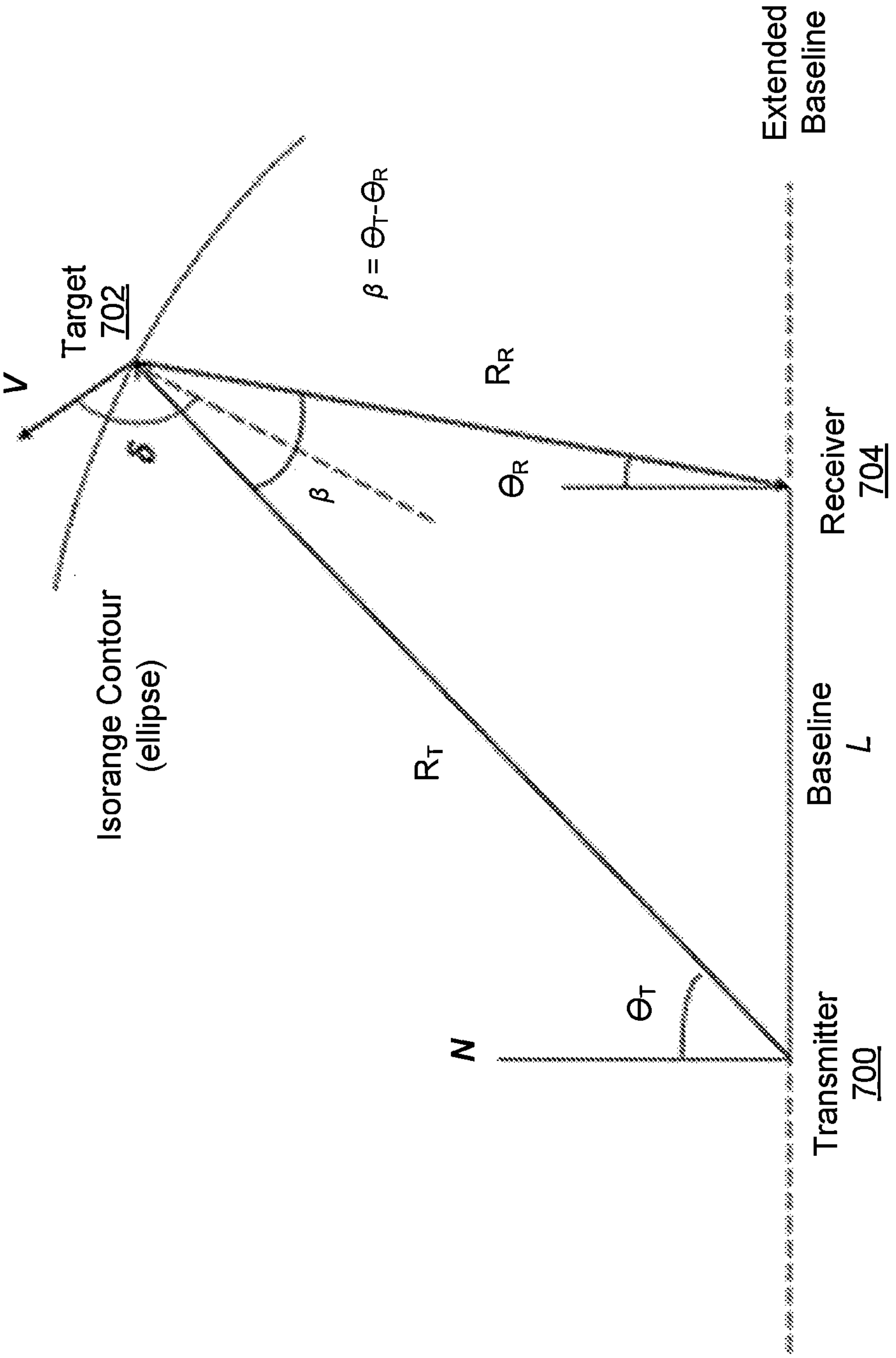
FIG. 7 is a diagram illustrating an example geometry for bistatic sensing, in accordance with some aspects of the present disclosure.

FIG. 7 is a diagram illustrating geometry for bistatic sensing, in accordance with some aspects of the present disclosure. FIG. 7 shows a bistatic radar North-reference coordinate system in two-dimensions. In particular, FIG. 7 shows a coordinate system and parameters defining bistatic radar operation in a plane (referred to as a bistatic plane) containing a transmitter 700, a receiver 704, and a target 702. A bistatic triangle lies in the bistatic plane. The transmitter 700, the target 702, and the receiver 704 are shown in relation to one another. The transmitter 700 and the receiver 704 are separated by a baseline distance L. The extended baseline is defined as continuing the baseline distance L beyond either the transmitter 700 or the receiver 704. The target 702 and the transmitter 700 are separated by a distance RT, and the target 702 and the receiver 704 are separated by a distance RR.

Angles $\theta_T$ and $\theta_R$ are, respectively, the transmitter 700 and receiver 704 look angles, which are taken as positive when measured clockwise from North (N). The angles $\theta_T$ and $\theta_R$ are also referred to as angles of arrival (AOA) or lines of sight (LOS). A bistatic angle (β) is the angle subtended between the transmitter 700, the target 702, and the receiver 704 in the radar. In particular, the bistatic angle is the angle between the transmitter 700 and the receiver 704 with the vertex located at the target 702. The bistatic angle is equal to the transmitter 700 look angle minus the receiver 704 look angle $\theta_R$ (e.g., $\beta=\theta_T-\theta_R$).

When the bistatic angle is exactly zero (0), the radar is considered to be a monostatic radar; when the bistatic angle is close to zero, the radar is considered to be pseudo-monostatic; and when the bistatic angle is close to 180 degrees, the radar is considered to be a forward scatter radar. Otherwise, the radar is simply considered to be, and referred to as, a bistatic radar. The bistatic angle (β) can be used in determining the radar cross section of the target.

Figure 8:
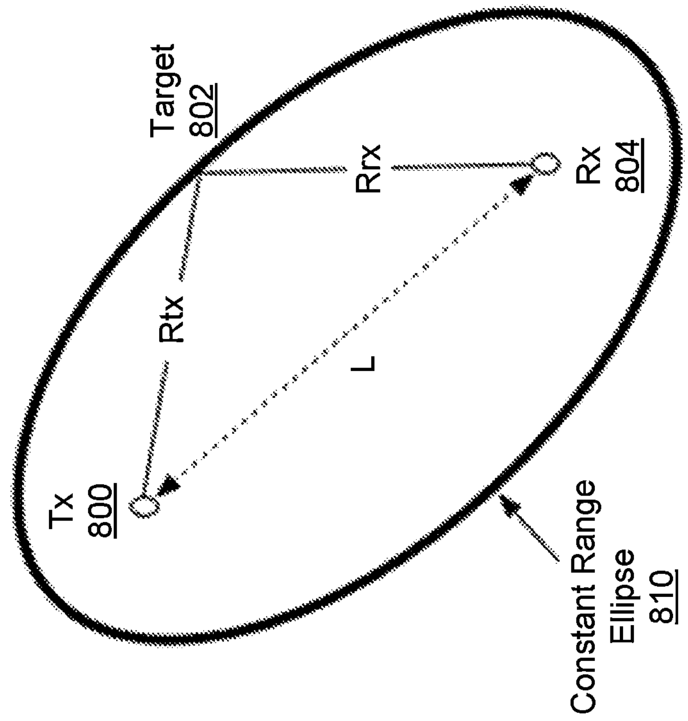
FIG. 8 is a diagram illustrating a bistatic range of bistatic sensing, in accordance with some aspects of the present disclosure.

FIG. 8 is a diagram illustrating an example of a bistatic range 810 of bistatic sensing, in accordance with some aspects of the present disclosure. In this figure, a transmitter (Tx) 800, a target 802, and a receiver (Rx) 804 of a radar are shown in relation to one another. The transmitter 800 and the receiver 804 are separated by a baseline distance L, the target 802 and the transmitter 800 are separated by a distance Rtx, and the target 802 and the receiver 804 are separated by a distance Rrx.

Bistatic range 810 (shown as an ellipse) refers to the measurement range made by radar with a separate transmitter 800 and receiver 804 (e.g., the transmitter 800 and the receiver 804 are located remote from one another). The receiver 804 measures the time of arrival from when the signal is transmitted by the transmitter 800 to when the signal is received by the receiver 804 from the transmitter 800 via the target 802. The bistatic range 810 defines an ellipse of constant bistatic range, referred to an iso-range contour, on which the target 802 lies, with foci centered on the transmitter 800 and the receiver 804. If the target 802 is at range Rrx from the receiver 804 and range Rtx from the transmitter 800, and the receiver 804 and the transmitter 800 are located a distance L apart from one another, then the bistatic range is equal to Rrx+Rtx−L. It should be noted that motion of the target 802 causes a rate of change of bistatic range, which results in bistatic Doppler shift.

Generally, constant bistatic range points draw an ellipsoid, with the transmitter 800 and the receiver 804 positions as the focal points. The bistatic iso-range contours are where the ground slices the ellipsoid. When the ground is flat, this intercept forms an ellipse (e.g., bistatic range 810). Note that except when the two platforms have equal altitude, these ellipses are not centered on a specular point.

Figure 9:
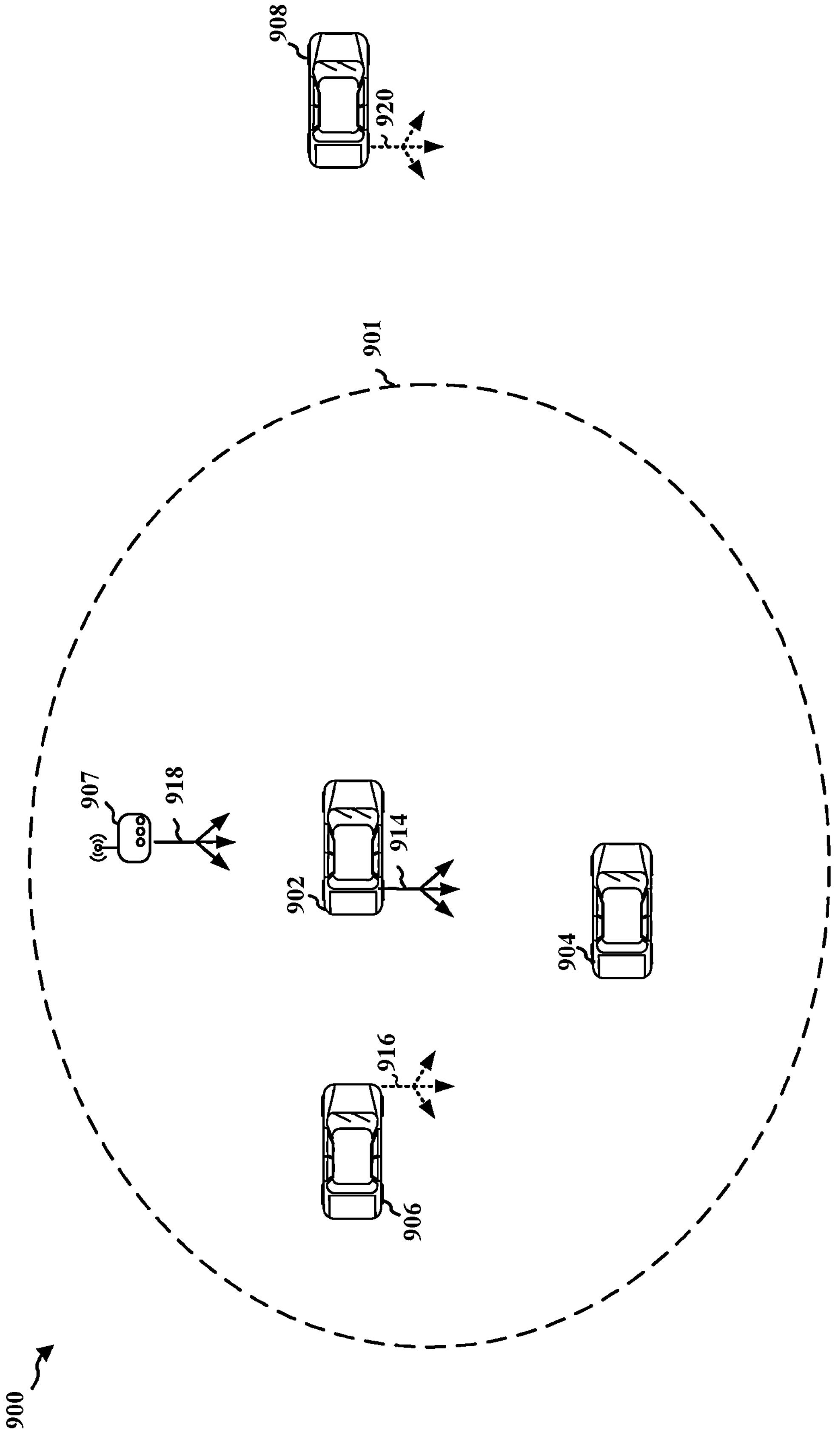
FIG. 9 is a diagram illustrating an example of devices involved in wireless communications (e.g., sidelink communications), in accordance with some aspects of the present disclosure.

FIG. 9 illustrates an example 900 of wireless communication between devices based on sidelink communications. The communication may be based on a slot structure (e.g., the slot structure as shown in FIG. 3). For example, transmitting UE 902 may transmit a transmission 914, e.g., comprising a control channel and/or a corresponding data channel, that may be received by receiving UEs 904, 906, 908. At least one UE may be in the form of an autonomous vehicle or an unmanned aerial vehicle. A control channel may include information for decoding a data channel and may also be used by receiving device to avoid interference by refraining from transmitting on the occupied resources during a data transmission. The number of transmission time intervals (TTIs), as well as the RBs, that will be occupied by the data transmission, may be indicated in a control message from the transmitting device. The UEs 902, 904, 906, 908 may each be capable of operating as a transmitting device in addition to operating as a receiving device. Thus, UEs 906, 908 are illustrated as transmitting transmissions 916, 920. The transmissions 914, 916, 920 (and 918 by a network device 907, such as a roadside unit) may be broadcast or multicast to nearby devices. For example, UE 914 may transmit communication intended for receipt by other UEs within a range 901 of UE 914. Additionally/alternatively, network device 907 may receive communication from and/or transmit communication 918 to UEs 902, 904, 906, 908. UEs 902, 904, 906, 908 or network device 907 may include a detection component. UEs 902, 904, 906, 908 or network device 907 may also include a vehicle-based safety message or mitigation component.

Figure 10:
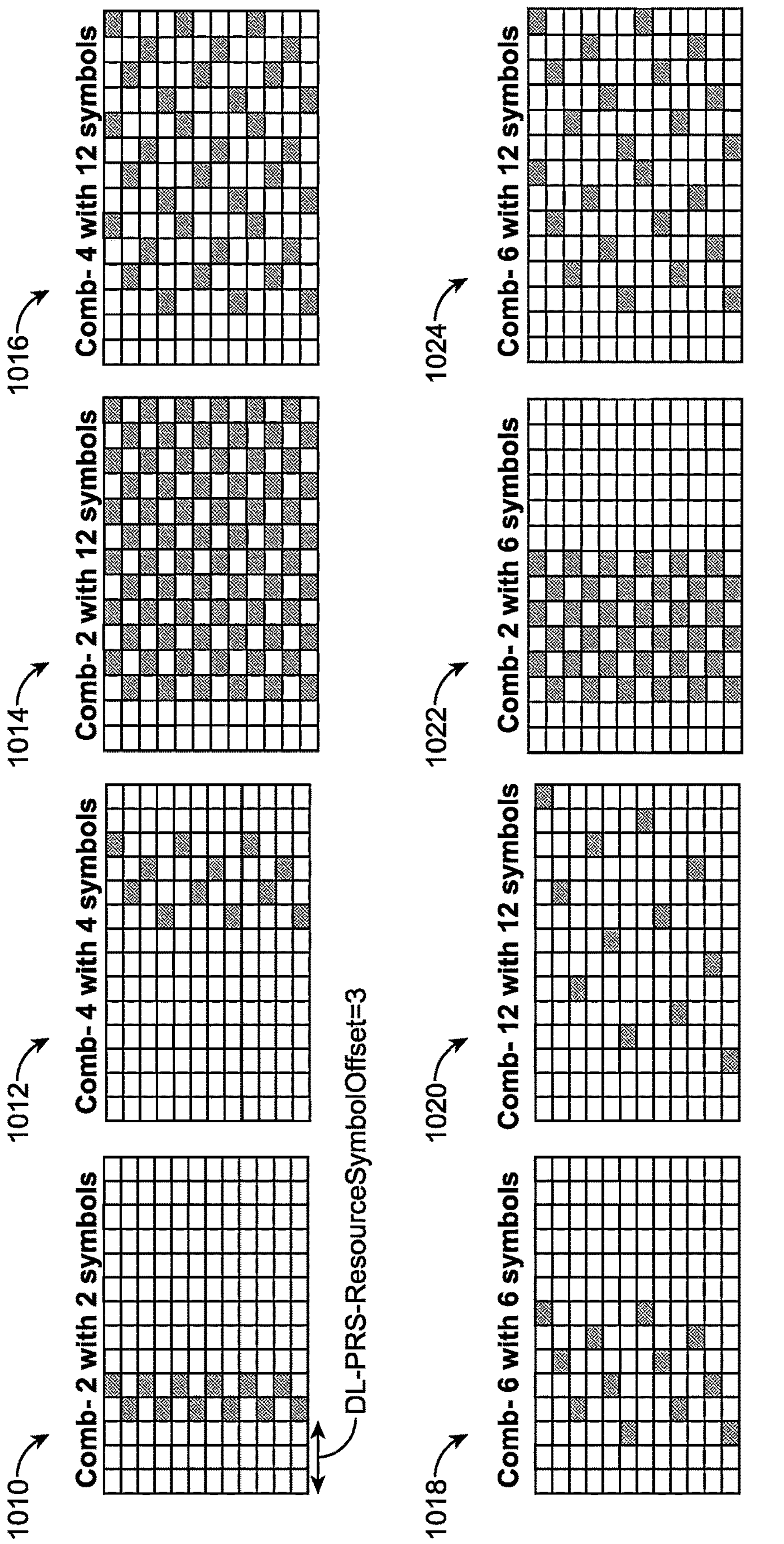
FIG. 10 is a diagram illustrating examples of existing comb structures for reference signals.
Figure 11:
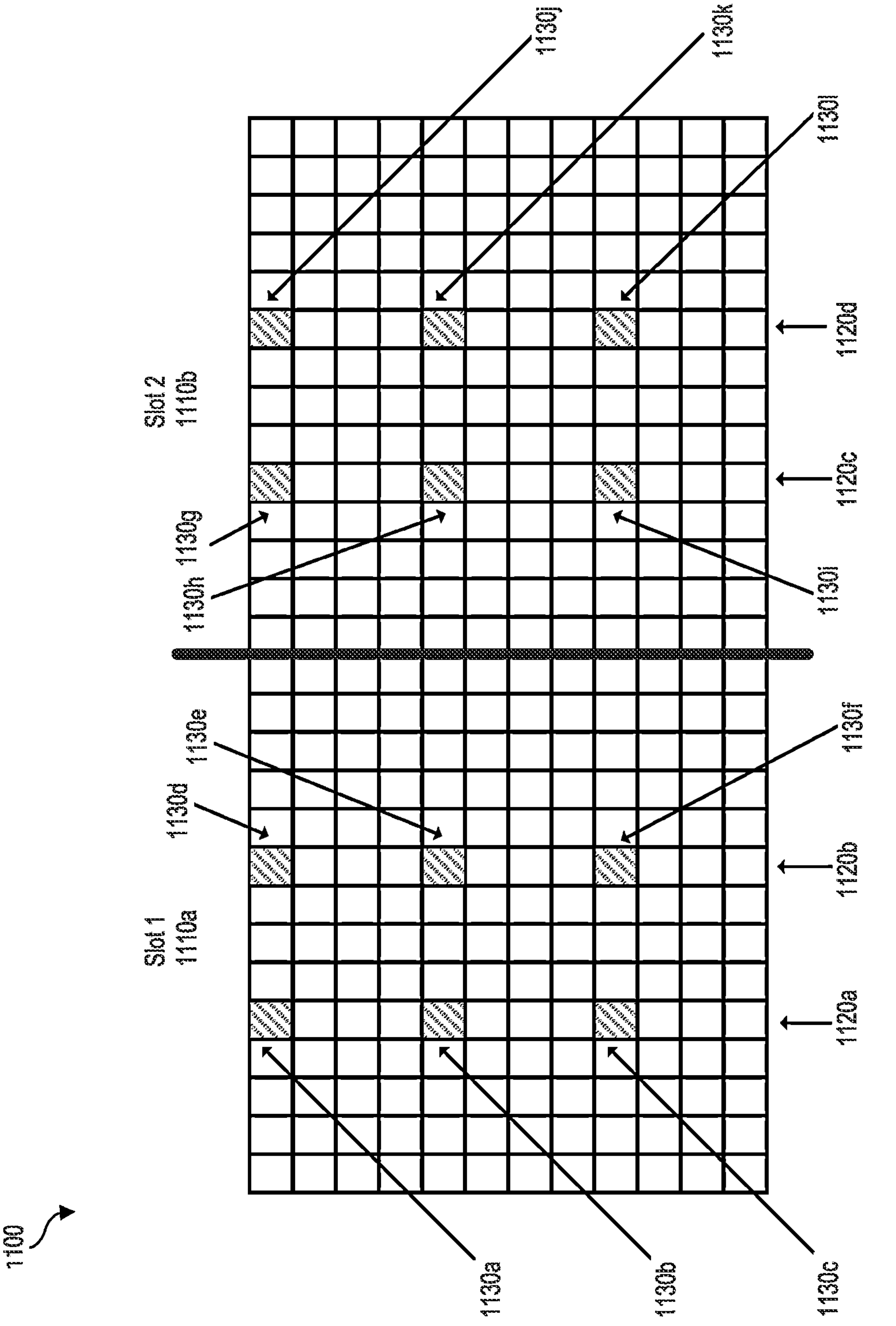
FIG. 11 is a diagram illustrating an example of a typical NR tracking reference signal (TRS) slot configuration.

Examples of comb structures for reference signals (e.g., a PRS, SRS, etc.) are shown in FIG. 10. For example, the comb structure 1010 is a comb-2 structure with two symbols (denoted as a comb-2/2-symbol structure). According to the comb-2/2-symbol structure of the comb structure 1010, every alternate symbol is assigned to the reference signal resources. The comb patterns in FIG. 10 are for one Transmission-Reception Point (TRP). A summary of the comb structures 1010, 1012, 1014, 1016, 1018, 1020, 1022, and 1024 are provided in Table 1 below:

FIG. 12 is a table 1200 illustrating an example of sensing performance of the NR TRS slot configuration 1100 of FIG. 11. In FIG. 12, the range resolution (Δd), velocity resolution (Δv), maximum operation range ($d_{max}$), and maximum velocity ($V_{max}$) for estimation are shown. The other variables in table 1200 of FIG. 12 include the speed of light (c), the bandwidth (W), the carrier frequency ($f_c$), the duration (gap) between the first and last symbols of one TRS ($T_B$) (e.g., one TRS may span across one or two slots), and the guard period ($T_g$) (e.g., duration of the carrier phase), and subcarrier spacing (Δf).

As shown in the table 1200, NR TRS has a low (or rough) velocity resolution (e.g., granularity) of approximately 228 (or 245) kilometers/hour (km/h). This means that the speed of a target moving at a lower speed than the velocity resolution (e.g., approximately 228 (or 245) km/h) cannot be identified using NR TRSs. Any speeds below the velocity resolution (e.g., approximately 228 (or 245) km/h) cannot be differentiated from one another, and will simply be determined to have a speed equal to the velocity resolution. For example, if a target is moving 100 km/h, then the speed of the target cannot be identified using NR TRSs, and the speed of the target will just be determined to be the velocity resolution (e.g., approximately 228 (or 245) km/h), which is vastly different than the true speed of 100 km/h. As such, the velocity resolution of NR TRS is not refined enough for many sensing applications.

| | 2-Symbols | 4-Symbols | 6-Symbols | 12-Symbols |
|---|---|---|---|---|
| Comb-2 | {0, 1} | {0, 1, 0, 1} | {0, 1, 0, 1, 0, 1} | {0, 1, 0, 1, 0, 1, 0, 1, 0, 1, 0, 1} |
| Comb-4 | N/A | {0, 2, 1, 3} | N/A | {0, 2, 1, 3, 0, 2, 1, 3, 0, 2, 1, 3} |
| Comb-6 | N/A | N/A | {0, 3, 1, 4, 2, 5} | {0, 3, 1, 4, 2, 5, 0, 1, 3, 4, 2, 5} |
| Comb-12 | N/A | N/A | N/A | {0, 6, 3, 9, 1, 7, 4, 10, 2, 8, 5, 11} |

FIG. 11 is a diagram illustrating an example of a typical NR tracking reference signal (TRS) slot configuration. In particular, FIG. 11 shows a typical two-slot NR TRS configuration, which includes a distribution of NR TRS resources **1130*a*-11301 (e.g., NR TRSs) across two slots (e.g., slot 1 1110*a* and slot 2 1110*b***). Up to a two-slot TRS configuration (e.g., a one or two slot configuration) is supported with a separation of four symbols.

Specifically, in FIG. 11, each slot **1110*a*, 1110*b* includes six TRS resources 1130*a*-1130*l*. For example, slot 1 1110*a* includes six TRS resources 1130*a*-1130*f*, and slot 2 1110*b* includes six TRS resources 1130*g*-11301. In each slot 1110*a*, 1110*b*, the TRS resources 1130*a*-11301 are positioned within two symbols 1120*a*, 1120*b*, 1120*c*, 1120*d* (e.g., the fifth and ninth columns of each of the two slots 1110*a*, 1110*b*). The two symbols of each slot (e.g., symbols 1120*a* and 1120*b* of slot 1 1110*a*, and symbols 1120*c* and 1120*d* of slot 2 1110*b*) have a separation of four symbols from each other. For example, symbols 1120*a* and 1120*b* of slot 1 1110*a* are separated from each other by four symbols, and symbols 1120*c* and 1120*d* of slot 2 1110*b*** are separated from each other by four symbols.

TRSs are typically employed for communications, not for sensing. For example, after a device (e.g., UE) receives TRSs, the device may estimate time offset and frequency offset parameters based on the TRSs for channel estimation for communications.

Regarding the sensing capability of TRSs, full-band TRSs (with rho equal to three) can support a similar range estimation capability as positioning reference signals (PRSs). However, each slot (e.g., slot 1 **111*a*, and slot 2 1110*b***) of the two-slot NR TRS configuration has a comb-4 structure without staggering, which can cause an aliasing problem for range estimation.

NR TRSs are not designed for sensing purposes, and have a low velocity resolution, as compared to radar RSs. The velocity resolution for NR TRSs is low because the duration (gap) between the first and last symbols of one TRS, which may span across two slots, (e.g., gap between symbol **1120*a* of slot 1 1110*a* and symbol 1120*d* of slot 2 1110*b***) is small, which equates to a short time duration between the symbols. This short time duration between the symbols causes a low velocity resolution.

As previously mentioned, due to larger bandwidths being allocated for wireless communications systems (e.g., including cellular communications systems such as 4G/LTE, 5G/NR, and beyond) and more use cases being introduced into the wireless communications systems, joint communications and RF sensing can be an essential feature for wireless communications systems. The disclosed systems and techniques employ TRSs for joint communications and sensing.

In RF sensing, especially for obtaining an accurate Doppler estimation, phase continuity needs to be maintained on the radar transmitter (Tx) side, which may be in the form of a base station or user equipment (UE). Phase continuity cannot be guaranteed for most NR reference signals (e.g., radar RSs), which may include NR positioning reference signals (PRSs). However, a radar receiver (Rx), which may be in the form of a UE, may assume (e.g., as per 3GPP specification) that the radar Tx maintains a phase coherence for up to two slots of NR TRS transmission from the radar Tx. A radar Rx can make this assumption about the phase coherence because a radar Rx typically uses TRSs to measure the frequency offset parameter, which requires phase coherence to obtain an accurate measurement.

3GPP, in Release 17/18, has formed an agreement for the radar Rx (e.g., UE) to report Doppler estimation based on TRS. The agreement mentions "Study, and if justified, specify CSI reporting enhancement for high/medium UE velocities exploiting time-domain correlation/Doppler-domain information" and "UE reporting of time-domain channel properties measured via CSI-RS for tracking." This means that, for high/medium media modality (e.g., communications with a fast moving device and/or if the radar Rx is fast moving), the radar Rx (e.g., UE) can report the time domain channel properties (e.g., Doppler) made with the channel state information-reference signal (CSI-RS) for tracking, which is equivalent to TRS.

The systems and techniques of the present disclosure enhance RF sensing by leveraging TRSs by associating TRSs with radar RSs for Doppler estimation. As previously mentioned, phase continuity cannot be guaranteed for most NR reference signals (e.g., radar RSs). The systems and techniques leverage TRSs to provide phase coherence to allow for an accurate Doppler estimation.

The systems and techniques also consider enhancement on communication performance by fine Doppler estimation supported by radar RSs. As previously mentioned, typically, TRSs are utilized to measure time offset and frequency offset parameters for channel estimation for communications. Since TRSs can only provide for a rough Doppler (velocity) resolution (e.g., as shown in table 1200 of FIG. 12), radar RSs can be employed to achieve a more refined Doppler (velocity) resolution than TRSs to provide for better communication performance.

In one or more examples, the systems and techniques associate TRSs and radar RSs for Doppler estimation. In some cases, the phase continuity may not be maintained at the radar Tx side (e.g., network device 1420 of FIG. 14), which may be in the form of a base station or UE. For these cases, there are several options that may be considered for Doppler estimation.

A first option, for when phase continuity may not be maintained on the radar Tx side, involves the association between a single port TRS and radar RS via a means of pure implementation (e.g., slot configuration) without any specification enhancements (e.g., standardized signaling enhancements). For this option, TRSs (e.g., TRS resources) and radar RSs (e.g., radar RS sensing resources) are associated for Doppler estimation by multiplexing the TRS resources and radar RS resources together within one slot, or within two consecutive slots (e.g., slot configuration 1300 of FIG. 13), with the same or similar bandwidth (BW). This association implicitly indicates to a radar Rx (e.g., network device 1410 of FIG. 14), which may be in the form of a UE, that phase coherence is maintained for both the TRSs and radar RSs. Then, both the TRSs and radar RSs may be utilized to provide for an accurate Doppler estimation. This slot configuration implementation is detectable because the radar Rx will detect this configuration during operation.

Figure 13:
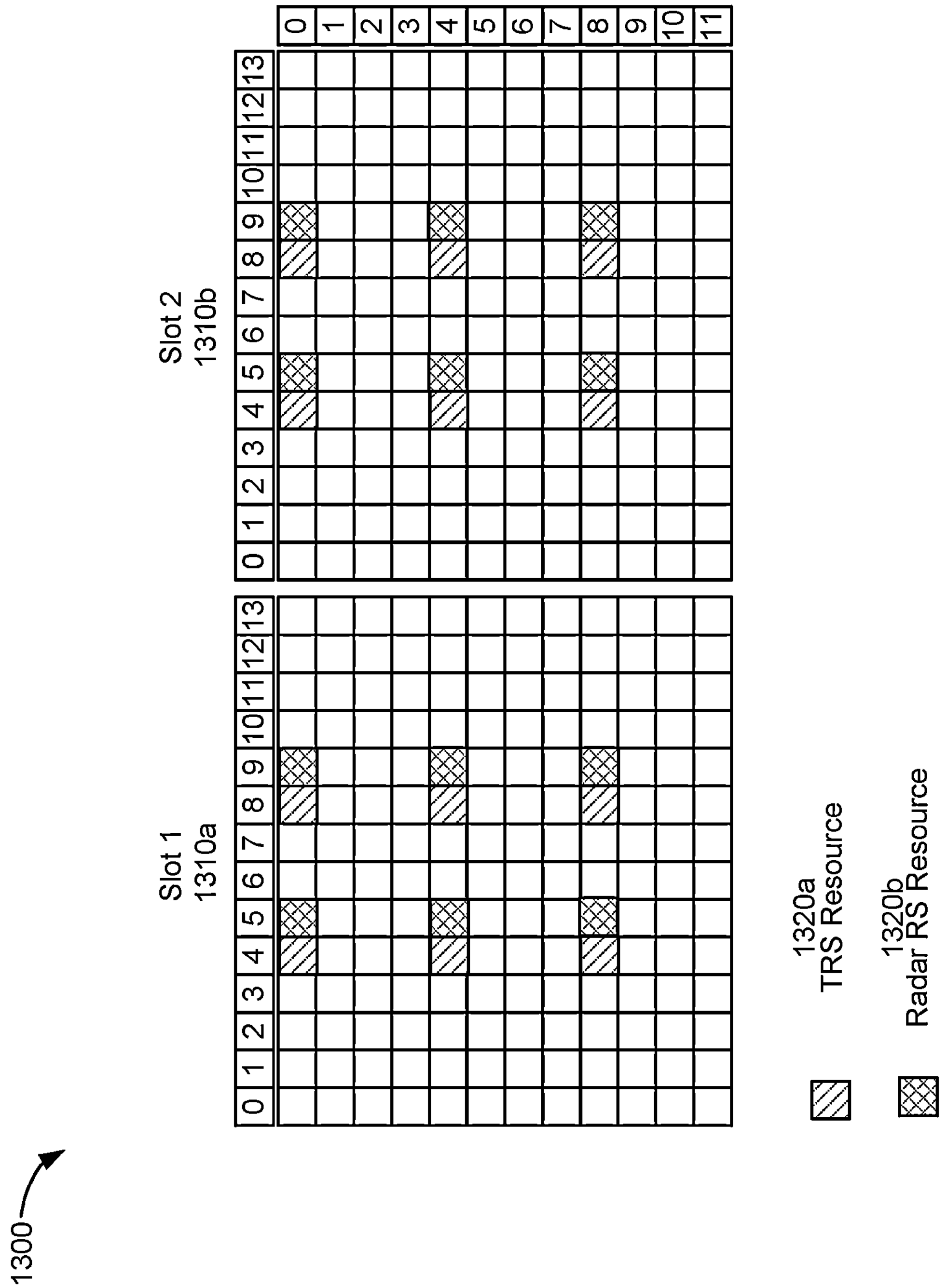
FIG. 13 is a diagram illustrating an example of a slot configuration including both TRS resources and radar reference signal (RS) resources, in accordance with some aspects of the present disclosure.

FIG. 13 shows an example of a slot configuration 1300 including both TRS resources 1320*a* and radar RS resources 1320*b*, in accordance with some aspects of the present disclosure. In particular, in FIG. 13, TRS resources 1320*a* and radar RS resources 1320*b* are multiplexed together within two consecutive slots (e.g., slot 1 1310*a* and slot 2 1310*b*), with the same or similar bandwidth (BW). As such, it can be assumed that phase coherence is maintained for the duration of these two slots 1310*a*, 1310*b*. It should be noted that the slot configuration 1300 shown in FIG. 13 is merely one example slot configuration 1300 of many different slot configurations (e.g., a slot configuration comprising of only one slot) that may be employed for the disclosed systems and techniques for employing TRSs for joint communications and sensing.

Figure 14:
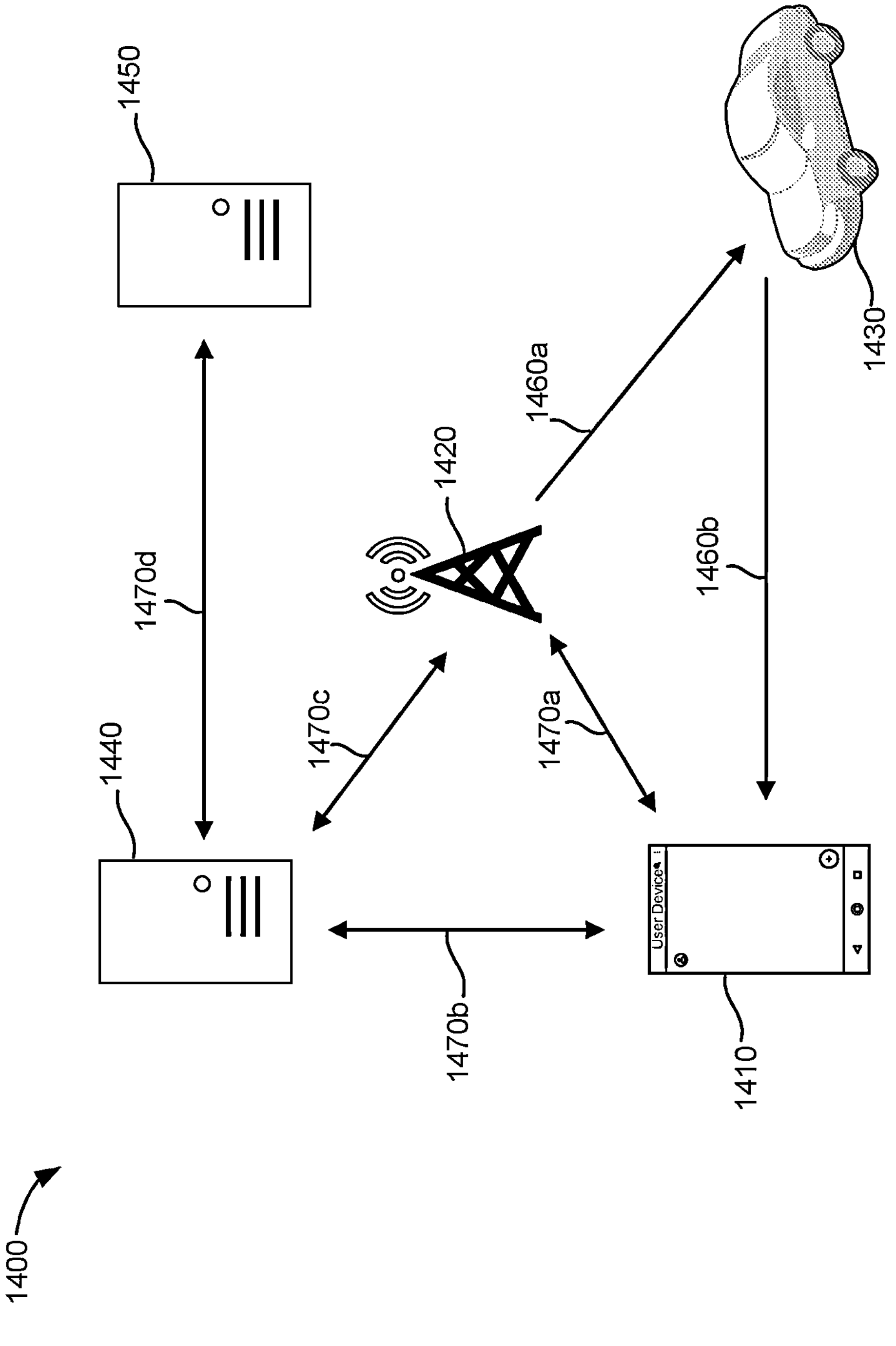
FIG. 14 is a diagram illustrating an example of a system for employing TRSs for joint communications and sensing, in accordance with some aspects of the present disclosure.

FIG. 14 is a diagram illustrating an example of a system 1400 for employing TRSs for joint communications and sensing, in accordance with some aspects of the present disclosure. In FIG. 14, the system 1400 is shown to include a network device 1410 in the form of a UE. The network device 1410 (e.g., UE) can operate as a radar Rx for sensing purposes. Also shown is a network device 1420 in the form of a base station (e.g., gNB or a portion of a gNB, such as a CU, DU, RU, Near-RT RIC, Non-RT RIC, etc.). The network device 1420 (e.g., gNB) can operate as a radar Tx for sensing purposes. The system 1400 also includes a plurality of network entities 1440, 1450, where network entity 1440 is in the form of a radar server and network entity 1450 is in the form of a location server.

The system 1400 may include more or less network devices and/or more or less network entities, than as shown in FIG. 14. In addition, the system 1400 may include different types of network devices (e.g., vehicles) and/or different types of network entities (e.g., network servers) than as shown in FIG. 14. Also, a UE may be employed as the radar Tx instead of a base station (e.g., gNB) as is shown in FIG. 14. In addition, in one or more examples, the network device 1410 (e.g., UE) may be equipped with heterogeneous capability, which may include, but is not limited to, 4G/5G cellular connectivity, GPS capability, camera capability, radar capability, and/or LIDAR capability. The network devices 1410, 1420 and network entities 1440, 1450 may be capable of performing wireless communications with each other via communications signals (e.g., signals 1470*a*, 1470*b*, 1470*c*, 1470*d*).

In one or more examples, the network devices 1410, 1420 may be capable of transmitting and receiving sensing signals of some kind (e.g., camera, RF sensing signals, optical sensing signals, etc.). In some cases, the network devices 1410, 1420 may transmit and receive sensing signals (e.g., RF sensing signals 1460*a*, 1460*b*) for using one or more sensors to detect nearby targets (e.g., target 1430, which is in the form of a vehicle). In some cases, the network devices 1410, 1420 can detect nearby targets based on one or more images or frames captured using one or more cameras.

The network device 1420, which may operate as a radar Tx, may perform RF sensing (e.g., bistatic sensing) of at least one target (e.g., target 1430) to obtain RF sensing measurements (e.g., Doppler, RTT, TOA, and/or TDOA measurements) of the target(s) (e.g., target 1430). The RF sensing measurements of the target(s) (e.g., target 1430) can be used (e.g., by at least one processor(s) of at least one of the network devices 1410, 1420 and/or at least one of the network entities 1440, 1450) to determine one or more characteristics (e.g., speed, location, distance, movement, heading, size, and/or other characteristics) of the target(s) (e.g., target 1430). As previously mentioned, generally, sensing involves monitoring moving targets (e.g., target 1430) with different motions (e.g., a moving car or pedestrian, a body motion of a person, such as breathing, and/or other micro-motions related to a target). Doppler, which measures the phase variation in a signal and is indicative of motion, is an important characteristic for sensing of a target (e.g., target 1430).

During operation of the system 1400, for example when performing bistatic sensing of a target (e.g., target 1430), a network device 1420 (e.g., base station), operating as a radar Tx, may transmit an RF sensing signal 1460*a* towards the target (e.g., target 1430). The RF sensing signal 1460*a* may comprise TRS resources and radar RS resources multiplexed together within one or two slots (e.g., slot configuration 1300 of FIG. 13). The sensing signal 1460*a* can reflect off of the target (e.g., target 1430) to produce an RF reflection sensing signal 1460*b*, which may be reflected towards network device 1410 (e.g., UE). The network device 1410 (e.g., UE), operating as a radar Rx, can receive the reflection sensing signal 1460*b*. After the network device (e.g., UE) receives the reflection sensing signal 1460*b*, the network device (e.g., UE) can obtain measurements (e.g., Doppler, RTT, TOA, and/or TDOA measurements) of the reflection sensing signal 1460*b*. At least one processor (e.g., processor 1610 of FIG. 16) of at least one of the network devices 1410, 1420 and/or at least one of the network entities 1440, 1450 may then determine or compute the characteristics (e.g., speed, location, distance, movement, heading, size, etc.) of the target (e.g., target 1430) by using sensing measurements (e.g., Doppler, RTT, TOA, and/or TDOA measurements) from the received reflection sensing signal 1460*b*.

In some examples, the network device 1410 (e.g., UE) may transmit the measurements (e.g., Doppler, RTT, TOA, and/or TDOA measurements) and/or determined characteristics (e.g., speed, location, distance, movement, heading, size, etc.) of the target (e.g., target 1430) to the network device 1420 (e.g., base station) and/or network entity 1440 (e.g., radar server) via communication signals 1470*a*, 1470*b*. The network device 1420 (e.g., base station) and/or network entity 1440 (e.g., radar server) may then transmit the measurements (e.g., Doppler, RTT, TOA, and/or TDOA measurements) and/or determined characteristics (e.g., speed, location, distance, movement, heading, size, etc.) of the target (e.g., target 1430) to the network entity 1440 (e.g., radar server) and/or network entity 1450 (e.g., location server) via communication signals 1470*c*, 1470*d*.

In one or more examples of the disclosed systems and techniques, for the first option, for when phase continuity may not be maintained on the radar Tx side (e.g., network device 1420), the radar Tx (e.g., network device) 1420 may explicitly indicate to the radar Rx (e.g., network device 1410) that the TRSs and radar RSs can be associated for Doppler estimation. In one or more examples, this indication may be through signaling, which may be a specification enhancement (e.g., a standardized signaling enhancement). In particular, this indication may be signaled (e.g., signal 1470*a*) from the radar Tx (e.g., network device 1420) to the radar Rx (e.g., network device 1410) through quasi-colocation Type C (QCL C) signaling between TRSs and radar RSs. As such, if the TRSs and radar RSs are associated with each other through the QCL C relationship, then this will indicate to the radar Rx (e.g., network device 1410) that the TRSs, radar RSs, or TRSs and radar RSs together can be used to estimate the Doppler.

In some examples, this indication may be included in the assistance data for sensing for the radar Rx (e.g., network device 1410). For these examples, the system data signaling (e.g., signal 1470*a*) from the radar Tx (e.g., network device 1420) to the radar Rx (e.g., network device 1410) can be used to indicate the association of the TRSs and radar RSs to the radar Rx (e.g., network device 1410).

In one or more examples, the TRSs and radar RSs should be scheduled together close in time. Although the TRSs and radar RSs do not need to be scheduled within the same slot as each other, it is better to schedule them close together in time to obtain an accurate Doppler measurement.

A second option, for when phase continuity may not be maintained on the radar Tx side, involves the radar Rx (e.g., network device 1410) reporting a Doppler measurement report (e.g., containing the obtained Doppler estimation based on the TRSs) to the radar server (e.g., network entity 1440). Generally, the radar Rx (e.g., network device 1410) sends (e.g., via signal 1470*a*) the Doppler measurement report to the radar Tx (e.g., network device 1420). This second option includes the radar Rx (e.g., network device 1410) sending (e.g., via signal 1470*b*) the Doppler measurement report to the radar server (e.g., network entity 1440). The radar server (e.g., network entity 1440) can collect Doppler measurement reports from a plurality of radar receivers (Rxs) for further processing.

In one or more examples, the TRS resources identifications (IDs) and associated radar RS resources IDs used for the Doppler estimation should be included in the Doppler measurement report. In some examples, a report in the physical (PHY) layer from the radar Rx (e.g., network device 1410) to the radar Tx (e.g., network device 1420) can be based on the radar Rx's Doppler measurement report for high Doppler communications. As such, PHY layer processing can use the Doppler estimation in the Doppler measurement report for high Doppler communications.

In one or more examples, upper layer signaling (e.g., signaling in the network beyond the base station) of the Doppler measurement report can be based on the New Radio Positioning Protocol A (NRPPa) protocol, similar to the radar Rx positioning measurement report. For example, the radar Rx (e.g., network device 1410) may send (e.g., signal 1470*a*) the Doppler measurement report to the radar Tx (e.g., network device 1420). The radar Tx (e.g., network device 1420) may then send (e.g., signal 1470*c*) the Doppler measurement report to the radar server (e.g., network entity 1440). Then, the radar server (e.g., network entity 1440) may use the NRPPa protocol for sending (e.g., signal 1470*d*) the Doppler measurement report to the location server (e.g., network entity 1450).

A third option, for when phase continuity may not be maintained on the radar Tx side, involves providing additional assistance data to the radar Rx (e.g., network device 1410). For example, the assistance data may be the power offset between the TRS and radar RS to enable receive signal combining by the radar Rx (e.g., network device 1410). If the radar RS is a multi-port reference signal, there could be a per port power offset configuration.

In one or more examples, the systems and techniques can provide enhancement on high Doppler communications through RF sensing. In some examples, the radar Rx (e.g., network device 1410) may be engaging in high mobility communications (e.g., communications with another device, such as a UE, moving at a high velocity and/or the radar Rx itself moving at a high velocity) and, as such, a high accuracy Doppler estimation may be needed to be able to maintain the high mobility communications. For these cases, the radar Rx (e.g., network device 1410) may obtain a high accuracy Doppler estimation from the radar RSs.

There are several options that may be considered for providing enhancement of high Doppler communications through RF sensing. A first option, for providing enhancement of high Doppler communications through RF sensing, involves providing assistance data to the radar Rx (e.g., network device 1410) to enable high accuracy Doppler estimation through radar RSs. In one or more examples, the assistance data may indicate the association between the TRSs and radar RSs. This association can implicitly indicate to the radar Rx (e.g., network device 1410) that phase coherence is guaranteed for the associated radar RSs. Then, the radar RSs may be utilized to provide for an accurate Doppler estimation. In some examples, the radar Tx (e.g., network device 1420) should maintain the phase coherence on the associated radar RSs as a Radio Access Network (RAN) 4 requirement, if the radar Tx (e.g., network device 1420) is able to support this feature.

In one or more examples, the assistance data may indicate the configuration of the radar RSs to the radar Rx (e.g., network device 1410). As previously mentioned, the association of TRSs and radar RSs together within a slot or within two consecutive slots, with the same or similar BW, implicitly indicates to the radar Rx (e.g., network device 1410) that phase coherence is maintained for the associated radar RSs. However, in some cases, the radar Rx (e.g., network device 1410) may not be scheduled for a sensing session and, as such, the radar RSs by default may be transparent to the radar Rx (e.g., network device 1410). For these cases, assistance signaling may be provided to the radar Rx (e.g., network device 1410) to indicate the configuration of the radar RSs with the TRSs to allow for the radar Rx (e.g., network device 1410) to recognize that the radar RSs are phase continuous and, as such, can provide for a high accuracy doppler measurement. The radar Rx (e.g., network device 1410) may then obtain a high accuracy Doppler estimation (e.g., Doppler measurement) from the radar RSs, and generate a Doppler measurement report for the high accuracy Doppler estimation based on the radar RSs. The radar Rx (e.g., network device 1410) may then send the Doppler measurement report based on the associated radar RSs to the radar server (e.g., network entity 1440) and/or radar Tx (e.g., network device 1420).

A second option, for providing enhancement of high Doppler communications through RF sensing, involves the radar Rx (e.g., network device 1410) sending a Doppler estimation report based on the associated radar RSs to the radar server (e.g., network entity 1440) and/or radar Tx (e.g., network device 1420). The Doppler estimation report can contain Doppler estimations based on TRSs and Doppler estimations based on radar RSs. TRSs can provide a coarse measurement of the Doppler, and radar RSs can provide a more refined measurement of the Doppler.

In some examples, the Doppler measurement report could be per path, or for a selection of paths. For example, for a multi-path channel, each path can create a specific reflection signal off of a target (e.g., target 1430), and each reflection signal can have different Doppler. The Doppler measurement report may include a Doppler estimation for each path, or Doppler estimations from a selection of the paths.

A third option, for providing enhancement of high Doppler communications through RF sensing, involves the radar RSs being scheduled as close as possible to the TRSs in the time domain and the frequency domain. Scheduling the radar RSs as close as possible to the TRSs in the time and frequency domains ensures that the radar RSs are experiencing the channel that is most close to the channel experienced by the TRSs, which can be a requirement for communication aspects.

In one or more examples, the systems and techniques may have several additional options. One additional option is that PRSs may be treated as a special case of radar RSs, which for example may be a network implementation. For this option, PRS resources may be employed for the radar RS resources, which are multiplexed with the TRS resources (or, alternatively, sidelink single sideband resources) within the signal (e.g., slot configuration 1300 of FIG. 13). Another additional option is that the RF sensing (e.g., Universal Mobile Telecommunications System Air interface (Uu) interface-based RF sensing) can be applied to sidelink-based sensing. For this option, there may be an association between the sidelink (SL) radar RS and the SL single sideband (SSB) for Doppler estimation.

Another additional option is that the resource association can also be based on target speed. The target speed may be defined by the following pseudo code:

HorizontalVelocity

The IE HorizontalVelocity is used to describe a velocity shape as defined in TS 23.032 [15].

```
--ASN1START
HorizontalVelocity : : = SEQUENCE
bearing                INTEGER (0 . . 359)
horizontalSpeed        INTEGER (0 . . 2047)
}
--ANS1STOP
```

In one or more examples, when a radar RS is associated with another radar RS, the association may be based on a specific target speed or range of target speed. In some examples, the radar RS and associated TRS, or SSB in the sidelink, may be at different carrier components (CCs). When signals have the same carrier component (CC), it can be assumed that they have the same Doppler. However, when signals have different CCs, different Dopplers will be observed for the different CCs. Signals with different CCs cannot be associated based on Doppler because, even with the same speed, different Dopplers will be observed for the different CCs. As such, when signals have different CCs, they should be associated based on the speed, not based on Doppler. In one or more examples, there can be intra-band (e.g., using the same carrier frequency) and/or inter-band association (e.g., using different carrier frequencies) for the Doppler estimation. In some examples, the associated RSs from different CCs can be used to detect and track the target with a specific speed or range of speed.

Figure 15:
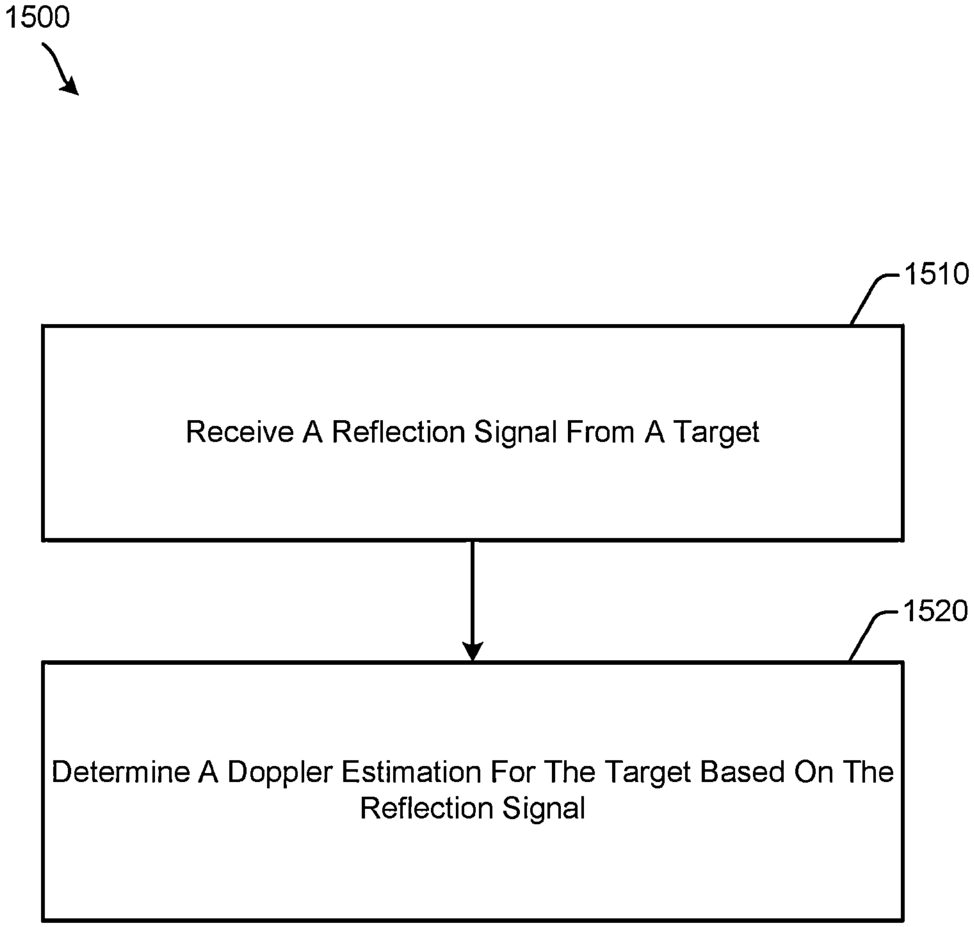
FIG. 15 is a flow chart illustrating an example of a process for wireless communications at a network device, in accordance with some aspects of the present disclosure.

FIG. 15 is a flow chart illustrating an example of a process 1500 for wireless communications that employs TRSs for joint communications and sensing. The process 1500 can be performed by a network device, such as a UE (e.g., a smart phone, smart watch, virtual reality glasses, or vehicle) or a network entity (e.g., a base station (e.g., gNB), a network server, etc.), or by a component or system (e.g., a chipset) of the network device. In some aspects, the network device operates as a radar receiver (Rx) for radio frequency (RF) sensing. The operations of the process 1500 may be implemented as software components that are executed and run on one or more processors (e.g., processor 1610 of FIG. 16 or other processor(s)). Further, the transmission and reception of signals by the wireless communications device in the process 1500 may be enabled, for example, by one or more antennas and/or one or more transceivers (e.g., wireless transceiver(s)).

At block 1510, the network device (or component thereof) may receive a reflection signal from a target. In some cases, the reflection signal includes tracking reference signal (TRS) resources and radar reference signal (RS) resources. In one illustrative example, the radar RS resources are positioning reference signal (PRS) resources. In some cases, the reflection signal comprises sidelink (SL) single sideband (SSB) resources and SL radar RS resources. In some aspects, the TRS resources and the radar RS resources (or the SL SSB resources and SL radar RS resources) are multiplexed together within one or two slots.

In some aspects, the reflection signal is based on a signal transmitted from a second network device that reflects off of the target. The second network device may be a UE or a base station. For instance, the second network device may operate as a radar transmitter (Tx) for radio frequency (RF) sensing (where the network device may operate as a radar Rx for RF sensing, as noted above).

At block 1520, the UE (or component thereof) may determine a Doppler estimation for the target based on the reflection signal. In some cases, the UE (or component thereof) may determine the Doppler estimation based on the TRS resources. In some cases, the UE (or component thereof) may determine the Doppler estimation based on the radar RS resources. In some examples, the UE (or component thereof) may determine the Doppler estimation based on the TRS resources and the radar RS resources. In some examples, the UE (or component thereof) may determine the Doppler estimation based on the SL SSB resources and/or the SL radar RS resources.

In some aspects, the UE (or component thereof) may receive signaling and/or assistance data from a network device indicating (e.g., the assistance data may include an indication, such as an information element (IE) or field) that the TRS resources and the radar RS resources (or the SL SSB resources and SL radar RS resources) are associated for estimating Doppler. For example, the TRS resources and the radar RS resources (or the SL SSB resources and SL radar RS resources) may be associated for estimating Doppler based on phase continuity between the TRS resources and the radar RS resources. In some examples, the signaling is received via quasi-colocation Type C (QCL C) signaling.

In some cases, as noted above, the UE (or component thereof) may receive assistance data from a network device. The assistance data may include a power offset between the TRS resources and the radar RS resources.

In some aspects, the UE (or component thereof) may generate a Doppler measurement report comprising the Doppler estimation. In some cases, the Doppler measurement report includes an identification of the TRS resources and an identification of the radar RS resources (or an identification of the SL SSB resources and an identification of the SL radar RS resources). In some examples, the UE (or component thereof) may output the Doppler measurement report for transmission to a second network device or a first network entity. In some cases, the UE (or component thereof) may output the Doppler measurement report for transmission to the second network device via a physical (PHY) layer. The second network device may be a base station, a UE, or other network device. In some cases, the Doppler measurement report may be received by a second network entity from the first network entity. In one illustrative example, the first network entity may be a radar server, a base station, or other network entity, and the second network entity may be a location server, a base station, or other network entity.

Figure 16:
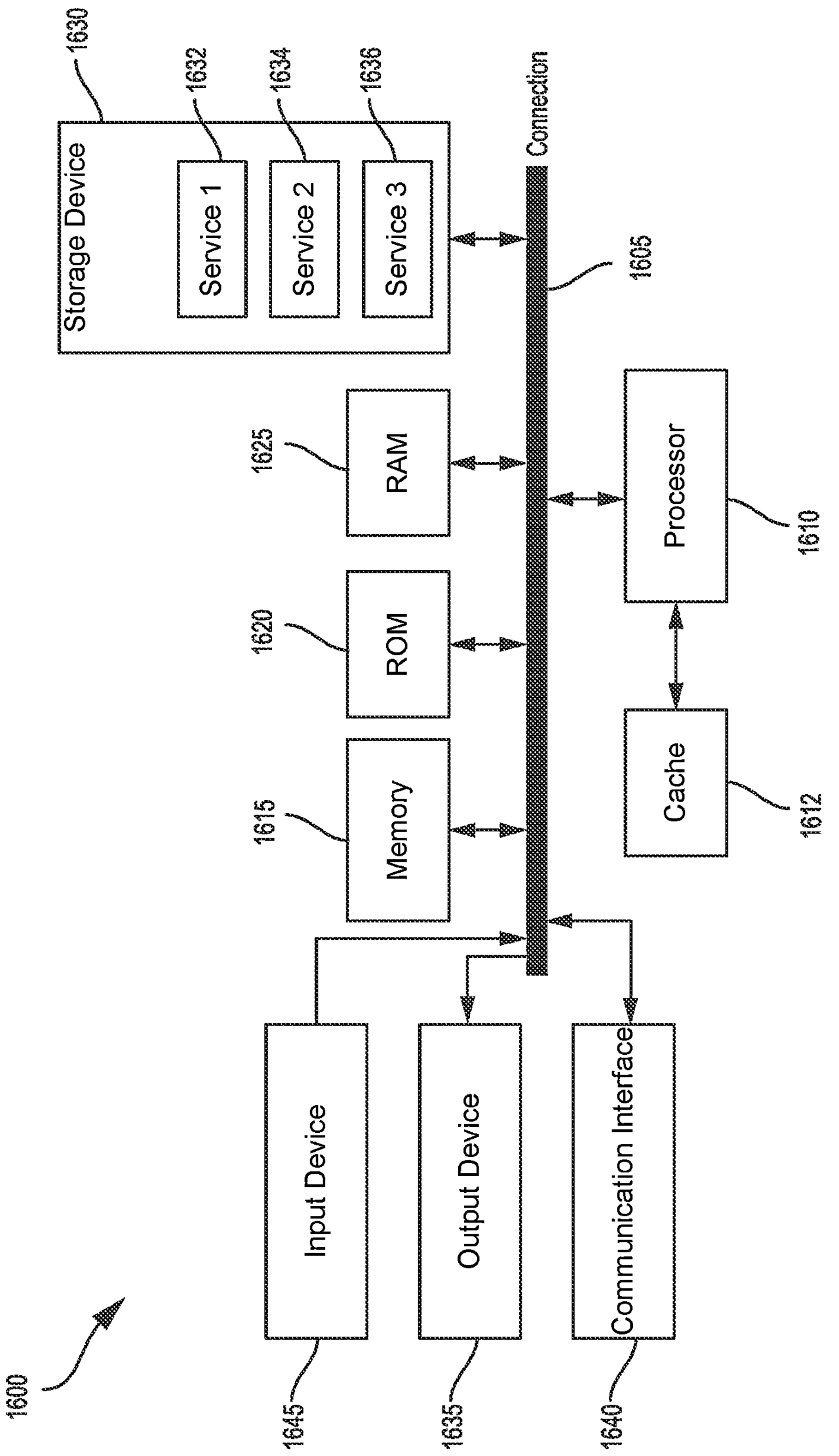
FIG. 16 is a block diagram illustrating an example of a computing system, which may be employed by the disclosed systems and techniques for employing TRSs for joint communications and sensing, in accordance with some aspects of the present disclosure.

FIG. 16 is a block diagram illustrating an example of a computing system 1600, which may be employed by the disclosed systems and techniques for employing TRSs for joint communications and sensing, in accordance with some aspects of the present disclosure. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some aspects, computing system 1600 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1600 includes at least one processing unit (CPU or processor) 1610 and connection 1605 that communicatively couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms. In some instances, multimodal systems can enable a user to provide multiple types of input/output to communicate with computing system 1600.

Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1640 may also include one or more range sensors (e.g., LIDAR sensors, laser range finders, RF radars, ultrasonic sensors, and infrared (IR) sensors) configured to collect data and provide measurements to processor 1610, whereby processor 1610 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some aspects, a hardware service that performs a particular function can include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, or A and B and C. The language “at least one of” a set and/or “one or more” of a set does not limit the set to the items listed in the set. For example, claim language reciting “at least one of A and B” or “at least one of A or B” can mean A, B, or A and B, and can additionally include items not listed in the set of A and B.

Illustrative aspects of the disclosure include:

Aspect 1. An apparatus for wireless communications, the apparatus comprising: at least one memory; and at least one processor coupled to the at least one memory and configured to: receive a reflection signal from a target, wherein the reflection signal comprises tracking reference signal (TRS) resources and radar reference signal (RS) resources; and determine a Doppler estimation for the target based on the reflection signal.

Aspect 2. The apparatus of Aspect 1, wherein the at least one processor is configured to: receive signaling from a network device, wherein the signaling indicates that the TRS resources and the radar RS resources are associated for estimating Doppler.

Aspect 3. The apparatus of Aspect 2, wherein the signaling is via quasi-colocation Type C (QCL C) signaling.

Aspect 4. The apparatus of any of Aspects 2 or 3, wherein the TRS resources and the radar RS resources are associated for estimating Doppler based on phase continuity between the TRS resources and the radar RS resources.

Aspect 5. The apparatus of any of Aspects 1 to 4, wherein the at least one processor is configured to: receive assistance data from a network device, wherein the assistance data comprises an indication that the TRS resources and the radar RS resources are associated for estimating Doppler.

Aspect 6. The apparatus of Aspect 5, wherein the TRS resources and the radar RS resources are associated for estimating Doppler based on phase continuity between the TRS resources and the radar RS resources.

Aspect 7. The apparatus of any of Aspects 1 to 6, wherein the TRS resources and the radar RS resources are multiplexed together within one or two slots.

Aspect 8. The apparatus of any of Aspects 1 to 7, wherein the apparatus operates as a radar receiver (Rx) for radio frequency (RF) sensing.

Aspect 9. The apparatus of any of Aspects 1 to 8, wherein the reflection signal is based on a signal transmitted from a network device reflecting off of the target.

Aspect 10. The apparatus of Aspect 9, wherein the network device is one of a UE or a base station.

Aspect 11. The apparatus of any of Aspects 9 or 10, wherein the network device operates as a radar transmitter (Tx) for radio frequency (RF) sensing.

Aspect 12. The apparatus of any of Aspects 1 to 11, wherein the at least one processor is configured to determine the Doppler estimation based on the TRS resources.

Aspect 13. The apparatus of any of Aspects 1 to 12, wherein the at least one processor is configured to determine the Doppler estimation based on the radar RS resources.

Aspect 14. The apparatus of any of Aspects 1 to 13, wherein the at least one processor is configured to: generate a Doppler measurement report comprising the Doppler estimation.

Aspect 15. The apparatus any of Aspect 14, wherein the Doppler measurement report comprises an identification of the TRS resources and an identification of the radar RS resources.

Aspect 16. The apparatus of any of Aspects 14 or 15, wherein the at least one processor is configured to: output the Doppler measurement report for transmission to a network device or a first network entity.

Aspect 17. The apparatus of Aspect 16, wherein the at least one processor is configured to output the Doppler measurement report for transmission to the network device via a physical (PHY) layer.

Aspect 18. The apparatus of any of Aspects 16 or 17, wherein the network device is one of a base station or a UE.

Aspect 19. The apparatus of any of Aspects 16 to 18, wherein the first network entity is a radar server.

Aspect 20. The apparatus of any of Aspects 16 to 19, wherein the Doppler measurement report is received by a second network entity from the first network entity.

Aspect 21. The apparatus of Aspect 20, wherein the second network entity is a location server.

Aspect 22. The apparatus of any of Aspects 1 to 21, wherein the at least one processor is configured to: receive assistance data from a network device, wherein the assistance data comprises a power offset between the TRS resources and the radar RS resources.

Aspect 23. The apparatus of any of Aspects 1 to 22, wherein the radar RS resources are positioning reference signal (PRS) resources.

Aspect 24. The apparatus of any of Aspects 1 to 23, wherein the apparatus is implemented as a user equipment (UE), and further comprising: a transceiver configured to receive the reflection signal.

Aspect 25. A method for wireless communications at a user equipment (UE), the method comprising: receiving, at the UE, a reflection signal from a target, wherein the reflection signal comprises tracking reference signal (TRS) resources and radar reference signal (RS) resources; and determining, at the UE, a Doppler estimation for the target based on the reflection signal.

Aspect 26. The method of Aspect 25, further comprising: receiving, at the UE, signaling from a network device, wherein the signaling indicates that the TRS resources and the radar RS resources are associated for estimating Doppler.

Aspect 27. The method of Aspect 26, wherein the signaling is via quasi-colocation Type C (QCL C) signaling.

Aspect 28. The method of any of Aspects 26 or 27, wherein the TRS resources and the radar RS resources are associated for estimating Doppler based on phase continuity between the TRS resources and the radar RS resources.

Aspect 29. The method of any of Aspects 25 to 28, further comprising: receiving, at the UE, assistance data from a network device, wherein the assistance data comprises an indication that the TRS resources and the radar RS resources are associated for estimating Doppler.

Aspect 30. The method of Aspect 29, wherein the TRS resources and the radar RS resources are associated for estimating Doppler based on phase continuity between the TRS resources and the radar RS resources.

Aspect 31. The method of any of Aspects 25 to 30, wherein the TRS resources and the radar RS resources are multiplexed together within one or two slots.

Aspect 32. The method of any of Aspects 25 to 31, wherein the UE operates as a radar receiver (Rx) for radio frequency (RF) sensing.

Aspect 33. The method of any of Aspects 25 to 32, wherein the reflection signal is based on a signal transmitted from a network device reflecting off of the target.

Aspect 34. The method of Aspect 33, wherein the network device is one of a UE or a base station.

Aspect 35. The method of any of Aspects 33 or 34, wherein the network device operates as a radar transmitter (Tx) for radio frequency (RF) sensing.

Aspect 36. The method of any of Aspects 25 to 35, wherein the Doppler estimation is determined based on the TRS resources.

Aspect 37. The method of any of Aspects 25 to 36, wherein the Doppler estimation is determined based on the radar RS resources.

Aspect 38. The method of any of Aspects 25 to 37, further comprising: generating, at the UE, a Doppler measurement report comprising the Doppler estimation.

Aspect 39. The method of Aspect 38, wherein the Doppler measurement report comprises an identification of the TRS resources and an identification of the radar RS resources.

Aspect 40. The method of any of Aspects 38 or 39, further comprising: transmitting, at the UE, the Doppler measurement report to a network device or a first network entity.

Aspect 41. The method of Aspect 40, wherein the Doppler measurement report is transmitted to the network device via a physical (PHY) layer.

Aspect 42. The method of any of Aspects 40 or 41, wherein the network device is one of a base station or a UE.

Aspect 43. The method of any of Aspects 40 to 42, wherein the first network entity is a radar server.

Aspect 44. The method of any of Aspects 40 to 43, wherein the Doppler measurement report is received by a second network entity from the first network entity.

Aspect 45. The method of Aspect 44, wherein the second network entity is a location server.

Aspect 46. The method of any of Aspects 25 to 45, further comprising: receiving, at the UE, assistance data from a network device, wherein the assistance data comprises a power offset between the TRS resources and the radar RS resources.

Aspect 47. The method of any of Aspects 25 to 46, wherein the radar RS resources are positioning reference signal (PRS) resources.

Aspect 48. An apparatus for wireless communications, the apparatus comprising: at least one memory; and at least one processor coupled to the at least one memory and configured to: receive a reflection signal from a target, wherein the reflection signal comprises sidelink (SL) single sideband (SSB) resources and SL radar reference signal (RS) resources; and determine a Doppler estimation for the target based on the reflection signal.

Aspect 49. The apparatus of Aspect 48, wherein the SL SSB resources and the radar RS resources are multiplexed together within one or two slots.

Aspect 50. The apparatus of any of Aspects 48 or 49, wherein the reflection signal is received via a Universal Mobile Telecommunications System Air interface (Uu).

Aspect 51. A method for wireless communications at a user equipment (UE), the method comprising: receiving, at the UE, a reflection signal from a target, wherein the reflection signal comprises sidelink (SL) single sideband (SSB) resources and SL radar reference signal (RS) resources; and determining, at the UE, a Doppler estimation for the target based on the reflection signal.

Aspect 52. The method of Aspect 51, wherein the SL SSB resources and the radar RS resources are multiplexed together within one or two slots.

Aspect 53. The method of any of Aspects 51 or 52, wherein the reflection signal is received via a Universal Mobile Telecommunications System Air interface (Uu).

Aspect 54. A non-transitory computer-readable medium having stored thereon instructions that, when executed by one or more processors, cause the one or more processors to perform operations according to any of Aspects 1 to 47.

Aspect 55. An apparatus for wireless communications comprising one or more means for performing operations according to any of Aspects 1 to 47.

Aspect 56. A non-transitory computer-readable medium having stored thereon instructions that, when executed by one or more processors, cause the one or more processors to perform operations according to any of Aspects 48 to 53.

Aspect 57. An apparatus for wireless communications comprising one or more means for performing operations according to any of Aspects 48 to 53.

Aspect 56. A non-transitory computer-readable medium having stored thereon instructions that, when executed by one or more processors, cause the one or more processors to perform operations according to any of Aspects 1 to 53.

Aspect 57. An apparatus for wireless communications comprising one or more means for performing operations according to any of Aspects 1 to 53.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for wireless communications, the apparatus comprising:
- at least one memory; and
- at least one processor coupled to the at least one memory and configured to:
  - receive a reflection signal from a target, wherein the reflection signal comprises tracking reference signal (TRS) resources and radar reference signal (RS) resources, and wherein the TRS resources and the radar RS resources are associated based on phase continuity between the TRS resources and the radar RS resources; and
  - determine a Doppler estimation for the target based on the reflection signal and based on the phase continuity between the TRS resources and the radar RS resources.

2. The apparatus of claim 1, wherein the at least one processor is configured to:
- receive signaling from a network device, wherein the signaling indicates that the TRS resources and the radar RS resources are associated for determining the Doppler estimation.

3. The apparatus of claim 2, wherein the signaling is via quasi-colocation Type C (QCL C) signaling.

4. The apparatus of claim 1, wherein the at least one processor is configured to:
- receive assistance data from a network device, wherein the assistance data comprises an indication that the TRS resources and the radar RS resources are associated for the Doppler estimation.

5. The apparatus of claim 1, wherein the TRS resources and the radar RS resources are multiplexed together within one or two slots.

6. The apparatus of claim 1, wherein the apparatus operates as a radar receiver (Rx) for radio frequency (RF) sensing.

7. The apparatus of claim 1, wherein the reflection signal is based on a signal transmitted from a network device reflecting off of the target.

8. The apparatus of claim 7, wherein the network device is one of a UE or a base station.

9. The apparatus of claim 7, wherein the network device operates as a radar transmitter (Tx) for radio frequency (RF) sensing.

10. The apparatus of claim 1, wherein the at least one processor is configured to determine the Doppler estimation based on the TRS resources.

11. The apparatus of claim 1, wherein the at least one processor is configured to determine the Doppler estimation based on the radar RS resources.

12. The apparatus of claim 1, wherein the at least one processor is configured to:

generate a Doppler measurement report comprising the Doppler estimation.

13. The apparatus of claim 12, wherein the Doppler measurement report comprises an identification of the TRS resources and an identification of the radar RS resources.

14. The apparatus of claim 12, wherein the at least one processor is configured to:

output the Doppler measurement report for transmission to a network device or a first network entity.

15. The apparatus of claim 14, wherein the at least one processor is configured to output the Doppler measurement report for transmission to the network device via a physical (PHY) layer.

16. The apparatus of claim 14, wherein the network device is one of a base station or a UE.

17. The apparatus of claim 14, wherein the first network entity is a radar server.

18. The apparatus of claim 14, wherein the Doppler measurement report is received by a second network entity from the first network entity.

19. The apparatus of claim 18, wherein the second network entity is a location server.

20. The apparatus of claim 1, wherein the at least one processor is configured to:

receive assistance data from a network device, wherein the assistance data comprises a power offset between the TRS resources and the radar RS resources.

21. The apparatus of claim 1, wherein the radar RS resources are positioning reference signal (PRS) resources.

22. The apparatus of claim 1, wherein the apparatus is implemented as a user equipment (UE), and further comprising:

a transceiver configured to receive the reflection signal.

23. A method for wireless communications at a user equipment (UE), the method comprising:

receiving, at the UE, a reflection signal from a target, wherein the reflection signal comprises tracking reference signal (TRS) resources and radar reference signal (RS) resources, and wherein the TRS resources and the radar RS resources are associated based on phase continuity between the TRS resources and the radar RS resources; and determining, at the UE, a Doppler estimation for the target based on the reflection signal and based on the phase continuity between the TRS resources and the radar RS resources.

24. The method of claim 23, further comprising:

receiving, at the UE, signaling from a network device, wherein the signaling indicates that the TRS resources and the radar RS resources are associated for estimating determining the Doppler estimation.

25. An apparatus for wireless communications, the apparatus comprising:

at least one memory; and at least one processor coupled to the at least one memory and configured to:

receive a reflection signal from a target, wherein the reflection signal comprises sidelink (SL) single sideband (SSB) resources and SL radar reference signal (RS) resources; and determine a Doppler estimation for the target based on the reflection signal, wherein the reflection signal is received via a Universal Mobile Telecommunications System Air interface (Uu).

26. The apparatus of claim 25, wherein the SL SSB resources and the radar RS resources are multiplexed together within one or two slots.

* * * * *